United States Patent
Yoneda et al.

(10) Patent No.: US 10,051,183 B2
(45) Date of Patent: Aug. 14, 2018

(54) IMAGE-CAPTURING DEVICE, SOLID-STATE IMAGE-CAPTURING ELEMENT, CAMERA MODULE, ELECTRONIC DEVICE, AND IMAGE-CAPTURING METHOD FOR SHAKE CORRECTION USING SHAKE ANGLE

(71) Applicant: SONY CORPORATION, Tokyo (JP)

(72) Inventors: Masato Yoneda, Chiba (JP); Soichi Kuwahara, Kanagawa (JP); Hiroyuki Hiraide, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/778,709

(22) PCT Filed: Mar. 14, 2014

(86) PCT No.: PCT/JP2014/056929
§ 371 (c)(1),
(2) Date: Sep. 21, 2015

(87) PCT Pub. No.: WO2014/156731
PCT Pub. Date: Oct. 2, 2014

(65) Prior Publication Data
US 2016/0057352 A1    Feb. 25, 2016

(30) Foreign Application Priority Data

Mar. 29, 2013  (JP) ................ 2013-074760
Feb. 26, 2014  (JP) ................ 2014-034958

(51) Int. Cl.
H04N 5/232     (2006.01)
G03B 5/00      (2006.01)

(52) U.S. Cl.
CPC ..... H04N 5/23267 (2013.01); H04N 5/23251 (2013.01); H04N 5/23287 (2013.01);
(Continued)

(58) Field of Classification Search
None
See application file for complete search history.

(56) References Cited

U.S. PATENT DOCUMENTS

2006/0187333 A1   8/2006  Kobayashi et al.
2009/0021588 A1*  1/2009  Border ............... H04N 5/23248
                                                    348/208.1
(Continued)

FOREIGN PATENT DOCUMENTS

JP   2000-224462 A    8/2000
JP   2001-358999 A   12/2001
(Continued)

OTHER PUBLICATIONS

International Search Report prepared by the Japanese Patent Office dated Mar. 28, 2014, for International Application No. PCT/JP2014/056929.
(Continued)

Primary Examiner — Justin P. Misleh
(74) Attorney, Agent, or Firm — Sheridan Ross P.C.

(57) ABSTRACT

There is provided an image-capturing device including an image-capturing unit that captures a subject to output the captured image, a detection unit that physically detects a shake angle when the image-capturing unit has shaken, and a correction processing unit that calculates a correction amount based on an arrangement position of a pixel constituting the image outputted by the image-capturing unit and the shake angle detected by the detection unit, to correct the image according to the correction amount.

17 Claims, 27 Drawing Sheets

(52) U.S. Cl.
CPC ........ *G03B 5/00* (2013.01); *G03B 2205/0007* (2013.01); *G03B 2217/005* (2013.01); *H04N 5/2329* (2013.01); *H04N 5/23258* (2013.01)

(56) References Cited

U.S. PATENT DOCUMENTS

| | | | |
|---|---|---|---|
| 2009/0128700 A1 | 5/2009 | Oshino et al. | |
| 2010/0177198 A1* | 7/2010 | Hayashi ................... | G03B 5/00 348/208.2 |
| 2012/0274800 A1* | 11/2012 | Vakil .................... | H04N 5/2252 348/222.1 |
| 2014/0184837 A1* | 7/2014 | Shibata .............. | H04N 5/23267 348/208.6 |
| 2014/0232886 A1* | 8/2014 | Takayama .......... | H04N 5/23254 348/208.6 |

FOREIGN PATENT DOCUMENTS

| | | |
|---|---|---|
| JP | 2006-304313 | 11/2006 |
| JP | 2010-252123 A | 11/2010 |

OTHER PUBLICATIONS

Extended European Search Report for European Patent Application No. 14774235.7 dated Sep. 23, 2016, 9 pages.
Official Action (with English translation) for Chinese Patent Application No. 201480016625.5, dated Jan, 29, 2018, 11 pages.
Official Action (no translation available) for Japanese Patent Application 2015-508304, dated Jan. 9, 2019, 5 pages.

\* cited by examiner

FIG. 5

| D \ α | 0.00° | 5.00° | 10.00° | 15.00° | 20.00° | 25.00° |
|---|---|---|---|---|---|---|
| 25cm | 0.70 | 1.19 | 1.69 | 2.20 | 2.74 | 3.31 |
| 50cm | 0.35 | 0.59 | 0.84 | 1.10 | 1.37 | 1.66 |
| 1m | 0.17 | 0.30 | 0.42 | 0.55 | 0.69 | 0.83 |
| 2m | 0.09 | 0.15 | 0.21 | 0.28 | 0.34 | 0.41 |
| 3m | 0.06 | 0.10 | 0.14 | 0.18 | 0.23 | 0.28 |
| 5m | 0.03 | 0.06 | 0.08 | 0.11 | 0.14 | 0.17 |

FIG. 8

| D \ α | 0.00° | 5.00° | 10.00° | 15.00° | 20.00° | 25.00° | 30.00° | 35.00° |
|---|---|---|---|---|---|---|---|---|
| 25cm | 0.62 | 1.06 | 1.50 | 1.96 | 2.43 | 2.94 | 3.50 | 4.11 |
| 50cm | 0.31 | 0.53 | 0.75 | 0.98 | 1.22 | 1.47 | 1.75 | 2.05 |
| 1m | 0.15 | 0.26 | 0.37 | 0.49 | 0.61 | 0.74 | 0.87 | 1.03 |
| 2m | 0.08 | 0.13 | 0.19 | 0.24 | 0.30 | 0.37 | 0.44 | 0.51 |
| 3m | 0.05 | 0.09 | 0.12 | 0.16 | 0.20 | 0.25 | 0.29 | 0.34 |
| 5m | 0.03 | 0.05 | 0.07 | 0.10 | 0.12 | 0.15 | 0.17 | 0.21 |

FIG. 25

| r [mm] | θ | r·sinθ [μm] | r·(1−cosθ) [μm] | D [m] | 2·D·tanβ [m] | δx |
|---|---|---|---|---|---|---|
| 100 | 0.5 | 872.7 | 3.8 | 2.4 | 2.47 | 1.5 |
| 100 | 0.5 | 872.7 | 3.8 | 1.4 | 1.44 | 2.5 |
| 100 | 0.5 | 872.7 | 3.8 | 0.35 | 0.36 | 10.1 |

IMAGE-CAPTURING DEVICE, SOLID-STATE IMAGE-CAPTURING ELEMENT, CAMERA MODULE, ELECTRONIC DEVICE, AND IMAGE-CAPTURING METHOD FOR SHAKE CORRECTION USING SHAKE ANGLE

CROSS REFERENCE TO RELATED APPLICATIONS

This application is a national stage application under 35 U.S.C. 371 and claims the benefit of PCT Application No. PCT/JP2014/056929 having an international filing date of Mar. 14, 2014, which designated the United States, which PCT application claimed the benefit of Japanese Patent Application No. 2013-074760 filed Mar. 29, 2013, and Japanese Patent Application No. 2014-034958 filed Feb. 26, 2014, the disclosures of which are incorporated herein by reference in their entirety.

TECHNICAL FIELD

The present disclosure relates to an image-capturing device, a solid-state image-capturing element, a camera module, an electronic device, and an image-capturing method. Specifically, it relates to an image-capturing device, a solid-state image-capturing element, a camera module, an electronic device, and an image-capturing method, which can perform more effective camera shake correction.

BACKGROUND ART

In an electronic device including an image-capturing function, such as a digital still camera and a digital video camera, a camera shake correction system that corrects a camera shake in capturing to output an image free from the camera shake has been adopted in the past. There are two types of existing camera shake corrections: an electronic camera shake correction and an optical camera shake correction.

In the electronic camera shake correction, the camera shake is corrected by detecting a shake of a subject being captured from a captured image between continuous images, and performs image processing of moving a position of the image according to the shake amount. Such an electronic camera shake correction eliminates the need for a mechanical mechanism, and allows a structure to be downsized. However, since the shake is detected from the image, it has been difficult to detect the shake when the image is not clear in a dark place. Further, the comparison with the previous images requires a memory area for storing all of the previous images.

Moreover, in the electronic camera shake correction, since the camera shake amount is detected from two frames (images), it is extremely difficult to securely determine a moving object (dynamic body) in the image or a shift of the image due to the camera shake in every scene. Many algorithms including the determination of the dynamic body or the camera shake have been proposed, but have been being still improved at this time.

Moreover, in the optical camera shake correction, the camera shake is corrected by detecting how an image sensor has shaken by using a gyro or the like, and allowing a lens or the image sensor to operate by an increment of the reverse correction. In the optical camera shake correction, since the physical shake is detected, false recognition between the dynamic body and the camera shake does not occur unlike the electronic camera shake correction. Further, since the comparison with the previous images is not necessary, the frame memory for accumulating the previous pictures is not necessary. However, the optical camera shake correction not only increases a size of a structure of the operation unit, but increases power consumption due to the operation of the structure.

Further, in an image-capturing device adopting a complementary metal oxide semiconductor (CMOS) image sensor as an image-capturing element, since a shift of an exposure period (a shift of image-capturing timing) occurs for each line of the image-capturing element, it has been difficult to fully remove the effect of the camera shake in the past.

Accordingly, there has been proposed the camera shake correction processing of correcting the subject image for each line on the basis of the correction amount calculated from the shake amount when a predetermined line in the subject image is captured (see, for example, Patent Literature 1).

CITATION LIST

Patent Literature

Patent Literature 1: JP2006-304313A

SUMMARY OF INVENTION

Technical Problem

Meanwhile, although it is possible to uniformly correct the whole image both in the existing electronic camera shake correction and optical camera shake correction, it has been difficult to effectively correct the distortion occurring in the image due to the camera shake.

The present disclosure has been developed in light of such situation, and makes it possible to perform more effective camera shake correction.

Solution to Problem

An image-capturing device, a solid-state image-capturing element, a camera module, or an electronic device according to an embodiment of the present disclosure includes: an image-capturing unit that captures a subject to output the captured image; a detection unit that physically detects a shake angle when the image-capturing unit has shaken; and a correction processing unit that calculates a correction amount based on a position of a pixel constituting the image outputted by the image-capturing unit, and the shake angle detected by the detection unit, to correct the image according to the correction amount.

An image-capturing method according to an embodiment of the present disclosure for an image-capturing device including an image-capturing unit that captures a subject to output the captured image, and a detection unit that physically detects a shake angle when the image-capturing unit has shaken includes the steps of: outputting the image by the image-capturing unit; outputting the shake angle by the detection unit; and calculating a correction amount based on a position of a pixel constituting the image outputted by the image-capturing unit, and the shake angle detected by the detection unit, to correct the image according to the correction amount.

In an embodiment of the present disclosure, an image-capturing unit that captures a subject to output the captured image, and a detection unit that physically detects a shake angle when the image-capturing unit has shaken are included, and a correction amount based on positions of pixels constituting the image outputted by the image-capturing unit and the shake angle detected by the detection unit is calculated, and the image is corrected according to the correction amount.

Advantageous Effects of Invention

According to an embodiment of the present disclosure, it is possible to perform more effective camera shake correction.

BRIEF DESCRIPTION OF DRAWINGS

FIG. 5 is a diagram illustrating an example of an error distance δy obtained by using an elevation angle in a Y-axis direction and a subject distance as parameters.

FIG. 8 is a diagram illustrating an example of an error distance δx obtained by using an elevation angle in an X-axis direction and the subject distance as parameters.

FIG. 25 is a diagram illustrating an example of a relationship between a predetermined subject distance and the error distance δx in the X direction.

DESCRIPTION OF EMBODIMENTS

An embodiment to which the present technology is applied will be described in detail below with reference to the drawings.

Figure 1:
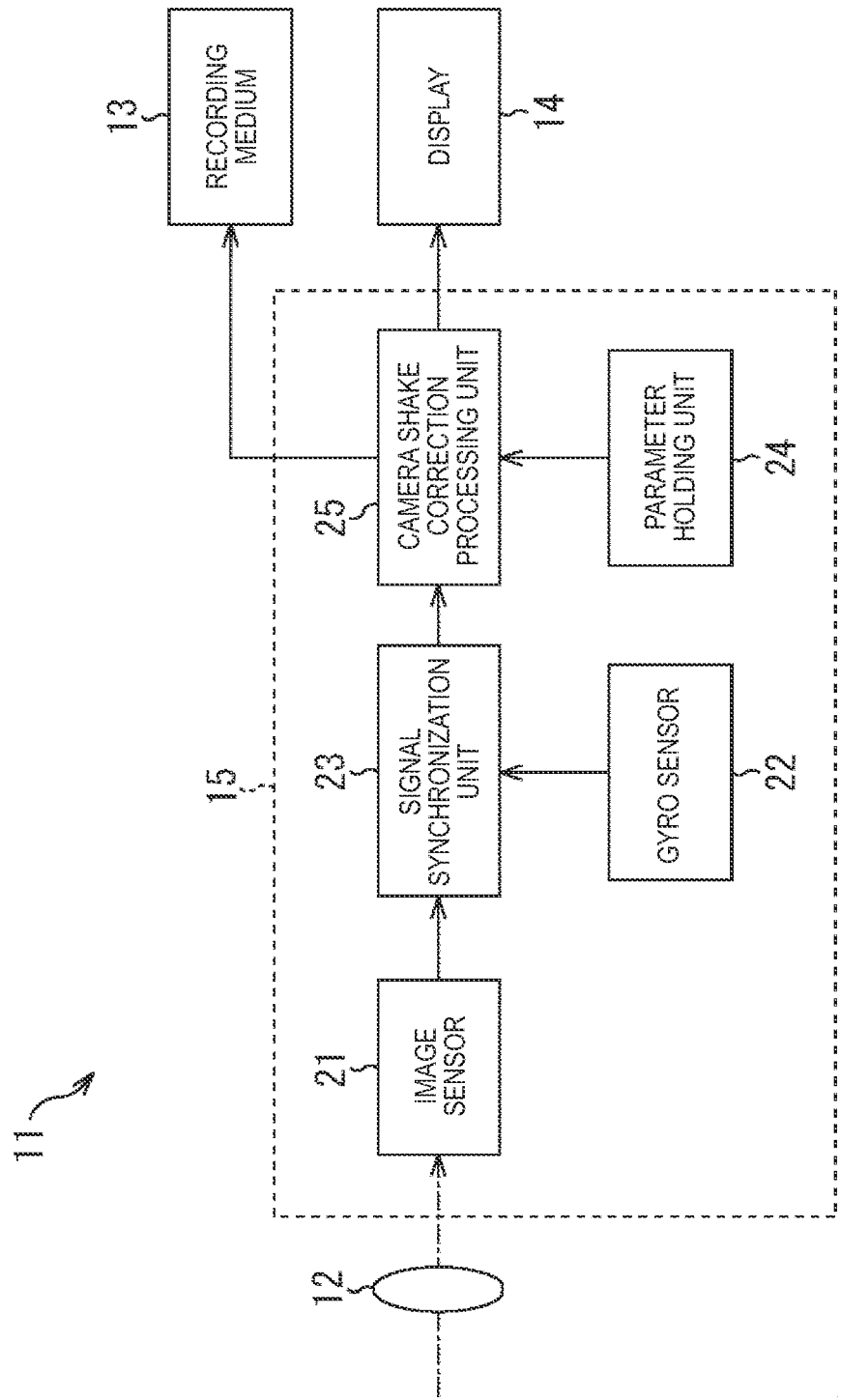
FIG. 1 is a block diagram illustrating a configuration example of an embodiment of an image-capturing device to which the present technology is applied.

FIG. 1 is a block diagram illustrating a configuration example of an embodiment of an image-capturing device to which the present technology is applied.

As shown in FIG. 1, an image-capturing device 11 is an electronic device having a main function of capturing an image, such as a digital still camera and a digital video camera, and includes an optical system 12, a recording medium 13, a display 14, and a camera module 15. Further, for example, as the image-capturing device 11, in addition to the electronic device having a main function of capturing an image, an electronic device including an image-capturing function, such as a multifunctional portable terminal called a so-called smartphone or tablet, is applicable.

The optical system 12 has one or a plurality of lenses, and collects light from a subject to form an image of the subject on a sensor surface of an image sensor 21 of the camera module 15.

The recording medium 13 is a built-in or removable memory (for example, an electrically erasable and programmable read only memory (EEPROM)) that is incorporated in the image-capturing device 11, or is detachably attached to the image-capturing device 11, and records a captured image outputted from the camera module 15.

The display 14 has, for example, a display unit such as a liquid crystal panel or an organic electro luminescence (EL) panel, and displays the captured image outputted from the camera module 15.

The camera module 15 includes the image sensor 21, a gyro sensor 22, a signal synchronization unit 23, a parameter holding unit 24, and a camera shake correction processing unit 25.

The image sensor 21 has an X-Y type image-capturing element for capturing an optical image of a subject to convert the captured image into an electronic signal, and a signal processing unit for subjecting the signal outputted from the image-capturing element to signal processing, and outputs an image signal having the subject captured therein. For example, the image sensor 21 is configured by a chip having the image-capturing element and the signal processing unit integrally laminated thereon, or by a unit having a chip of the image-capturing element and a chip of the signal processing unit combined thereon. Further, the signal processing unit performs pre-processing such as an automatic gain control (AGC) that amplifies the output of the image-capturing element, or analog digital (AD) conversion, and processing of converting the digital signal subjected to the pre-processing into an appropriate image signal format (such as Bayer, YUV or RGB).

The gyro sensor 22 is mounted adjacent to the image sensor 21, and physically (not in an image processing manner) detects a shake angle when the image sensor 21 has shaken. For example, the gyro sensor 22 is a detection unit for detecting an angle speed, and outputs gyro data indicating the shake angle obtained from the detected angle speed (hereinafter, appropriately, referred to also as camera shake amount information), at constant timing.

The signal synchronization unit 23 performs synchronization processing of synchronizing the image signal outputted from the image sensor 21 with the camera shake amount information outputted from the gyro sensor 22 at constant timing, to output the image signal and the camera shake amount information to the camera shake correction processing unit 25. Note that synchronization processing by the signal synchronization unit 23 will be described later with reference to FIG. 13 and FIG. 14.

The parameter holding unit 24 holds geometric optical specific parameters (for example, a view angle and a module pupil distance) of the module including the optical system 12 and the image sensor 21.

The camera shake correction processing unit 25 calculates a correction amount for the image signal on the basis of the image signal outputted from the signal synchronization unit 23, the camera shake mount information in synchronization with the image signal, and the specific parameters held in the parameter holding unit 24. The camera shake correction processing unit 25 then performs camera shake correction processing of correcting a camera shake of the image signal according to the calculated correction amount, converts the data into an image signal reduced in occurrence of the camera shake (hereinafter, appropriately, referred to also as a camera shake corrected image), and supplies the corrected image to the recording medium 13 and the display 14. Note that the detailed camera shake correction processing by the camera shake correction processing unit 25 will be described later with reference to FIG. 15 to FIG. 20.

First, with reference to FIG. 2 to FIG. 12, there will be described a principle and evaluation of the camera shake correction processing in the camera shake correction processing unit 25.

Figure 2:
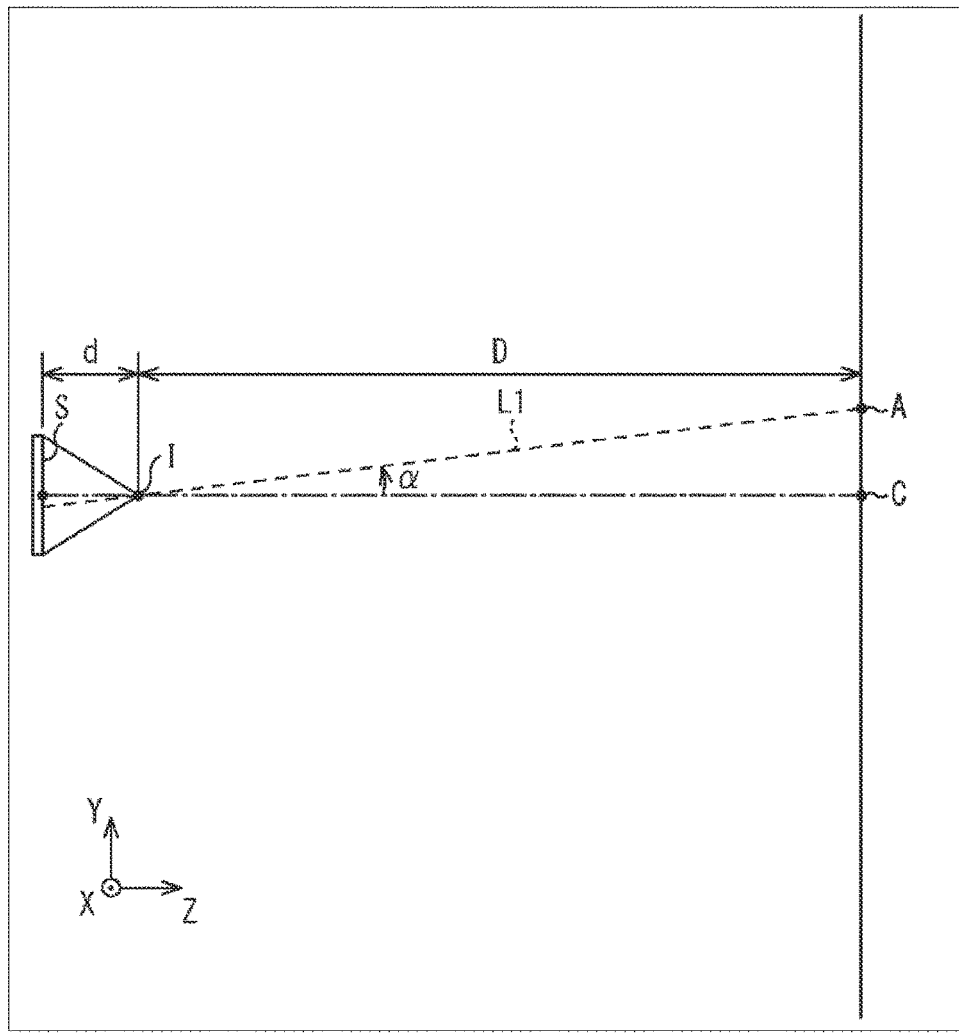
FIG. 2 is an explanatory diagram for explaining a relationship between a sensor surface and a subject surface of an image-capturing element.

First, as shown in FIG. 2, a relationship between a sensor surface S of the image sensor 21 and the subject surface is defined.

Each point on the subject surface passes through a pupil position I of the lens of the optical system 12 not shown (FIG. 1) to form an image on the sensor surface S. For example, a point C on the subject surface crossing the optical axis of the optical system 12 passes through the pupil position I to form an image at a substantial center of the sensor surface S (here the substantial center includes a center on the image on the subject surface S or the optical center of the sensor surface S, or the vicinity of the center on the image or the optical center of the sensor surface S, hereinafter, appropriately, referred to as a center point), and a point A on the subject surface positioned at an elevation angle α with respect to the optical axis of the optical system 12 forms an image at a point on the sensor surface S crossing a light beam L1 passing through the pupil position I from the point A.

Further, as shown in the drawing, an optical distance from the center point of the sensor surface S to the pupil position I is assumed to be a module pupil distance d, and an optical distance from the point C on the subject surface to the pupil position I is assumed to be a subject distance D. An axis perpendicular to the drawing and directed to the front is assumed to be an X axis, an axis directed from down to up in the drawing is assumed to be a Y axis, and an axis directed from left to right in the drawing is assumed to be a Z axis.

Then, it is assumed that the image capturing device 11 shakes by the camera shake in capturing, and the sensor surface S is rotationally moved at a shake angle θ along the X axis around a predetermined rotational center.

Figure 3:
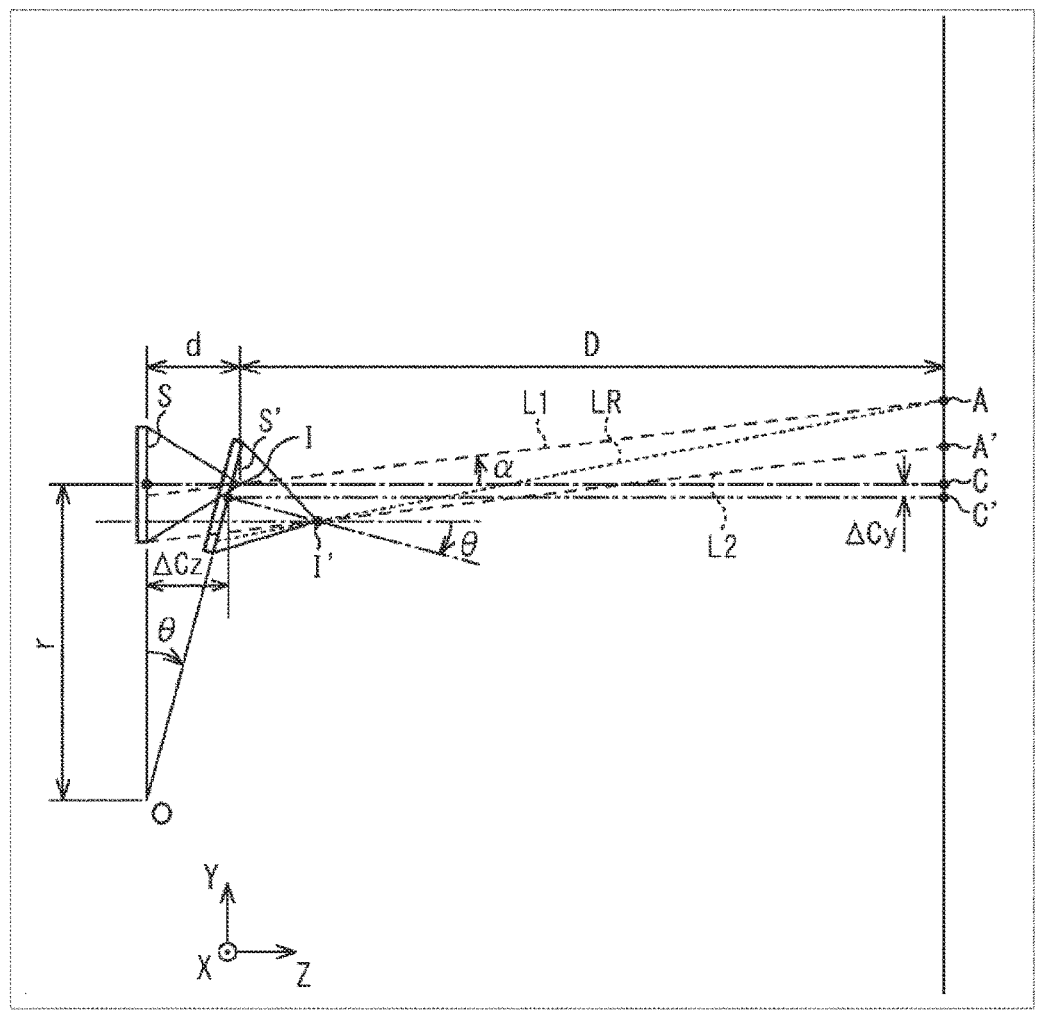
FIG. 3 is a diagram illustrating a relationship between before and after the sensor surface shakes.

That is, as shown in FIG. 3, when having been rotationally moved at the shake angle θ around a rotational center O, the sensor surface S is moved to a sensor surface S' and the pupil position I is moved to a pupil position I'. At this time, the point A that had been positioned at the elevation angle α before the image-capturing device 11 shakes forms an image at a position on the sensor surface S' crossing a light beam LR passing through the pupil position I' from the point A. That is, light from the point A on the subject surface forms an image at a point on the sensor surface S' along the light beam LR passing through the pupil position I' after the image-capturing device 11 has shaken, instead of the light beam L1 passing through the pupil position I before the image-capturing device 11 shakes.

At this time, the elevation angle of the light beam LR with respect to the optical axis of the optical system 12 after the image-capturing device 11 has shaken is unknown, and cannot be directly evaluated. Therefore, assuming that a point A' on the subject surface at which a light beam L2 having passed through the pupil position I' after the image-capturing device 11 has shaken, and being in parallel with the light beam L1 crosses the subject surface, corresponds to the point A on the subject surface, this positional relationship will be discussed.

First, when a distance from the rotational center O to the center point of the sensor surface S is a rotational radius r, in the rotational movement at the shake angle θ, a movement amount ΔCz when the center point of the sensor surface S moves in a Z-axis direction, and a movement amount ΔCy when the center point of the sensor surface S moves in a Y-axis direction are expressed by Formula (1) as follows.

[Math. 1]

$$\Delta Cz = r \cdot \text{SIN } \theta$$

$$\Delta Cy = r \cdot (1 - \text{COS } \theta) \quad (1)$$

Further, an imaged height A on the sensor surface of the point A on the subject surface crossing the light beam L1 at the elevation angle α before the image-capturing device 11 shakes, and an imaged height A' on the sensor surface of the point A' on the subject surface crossing the light beam L2 in parallel with the light beam L1 after the image-capturing device 11 has shaken are expressed by Formula (2) as follows.

[Math. 2]

$$A = d \cdot \text{TAN } \alpha$$

$$A' = d \cdot \text{TAN}(\alpha + \theta) \quad (2)$$

Therefore, when a distance difference between the point A and the point A' on the subject surface can be ignored on the sensor surface, a change amount ΔA of the imaged height in the rotational movement of the sensor surface S at the shake angle θ is expressed by Formula (3) as follows.

[Math. 3]

$$\Delta A = d \cdot (\text{TAN}(\alpha + \theta) - \text{TAN } \alpha) \quad (3)$$

In this manner, as expressed by Formula (3), the change amount ΔA of the imaged height can be obtained only by using the module pupil distance d, the shake angle θ and the elevation angle α, and these values are all known amounts. Therefore, if the module pupil distance d, the shake angle θ and the elevation angle α can withstand practical use, for example, it is possible to perform camera shake correction with great precision. Then, in order to evaluate whether or not the module pupil distance d, the shake angle θ and the elevation angle α can withstand practical use, assuming that the distance difference between the point A and the point A' on the subject surface can be ignored, it is necessary to consider the generated error amount.

Figure 4:
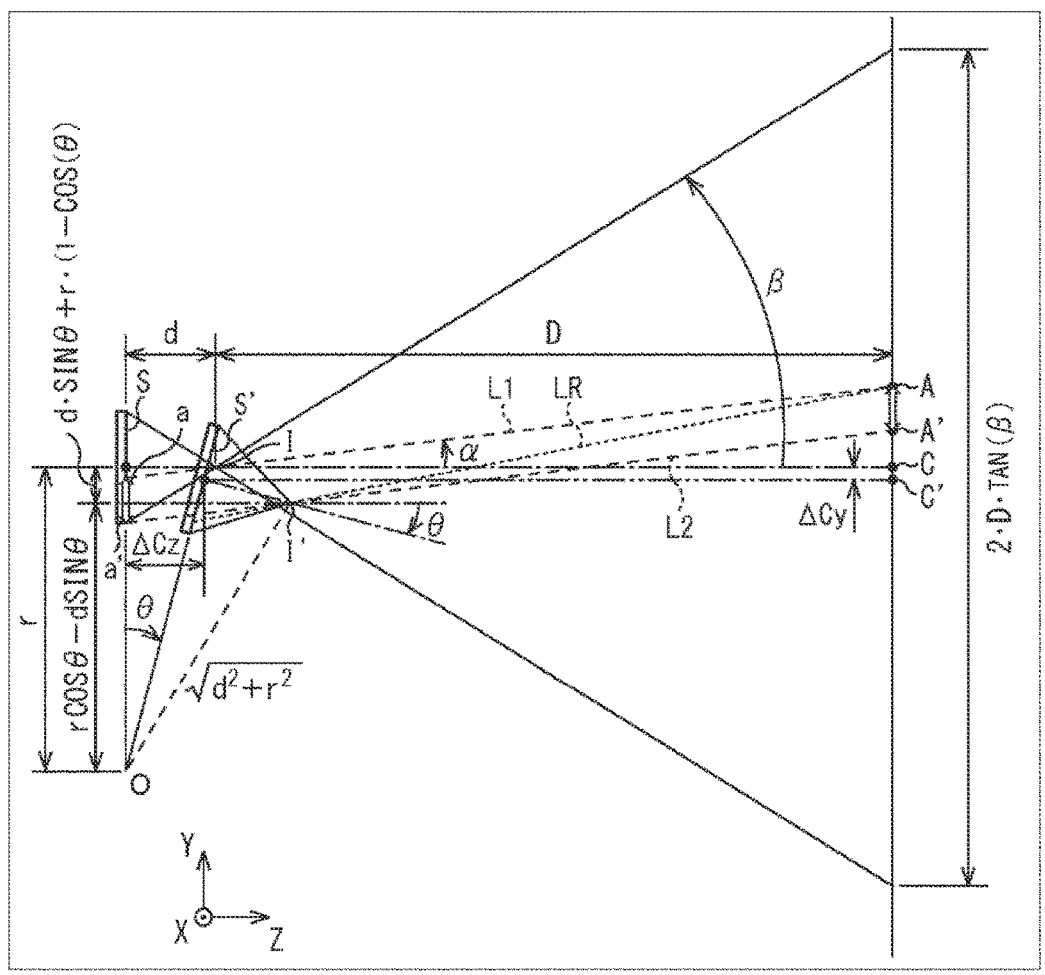
FIG. 4 is a diagram for explaining a distance difference in a Y direction by the shake.

For example, as shown in FIG. 4, a point a on the sensor surface S crossing the light beam L1 passing through the pupil position I from the point A on the subject surface is assumed to be a point a, and a point on a plane surface including the sensor surface S crossing the light beam L2 passing through the pupil position I' from the point A' on the subject surface is assumed to be a point a'. At this time, a distance difference (A−A') in the Y direction of the point A and the point A' on the subject surface geometrically optically equals to a distance difference (a−a') in the Y direction of the point a and the point a' on the plane surface including the sensor surface S, and is expressed by Formula (4) as follows.

[Math. 4]

$$A - A' = a - a' \quad (4)$$
$$= \sqrt{(d^2 + r^2) - (r \cdot \cos\theta - d \cdot \sin\theta)^2} \times \tan\alpha -$$
$$d \cdot \tan\alpha + d \cdot \sin\theta + r \cdot (1 - \cos\theta)$$
$$= \{r \cdot \sin\theta - d \cdot (1 - \cos\theta)\} \cdot \tan\alpha +$$
$$d \cdot \sin\theta + r \cdot (1 - \cos\theta)$$

An error distance δ(θ, α, D) of a pixel count on the sensor surface for evaluating whether the point A' on the subject surface can be considered as the point A can be obtained from the distance difference (A−A') obtained in this manner. That is, by using the distance difference (A−A'), a pixel count Ny of a side in the Y-axis direction of the image sensor 21, and a range capable of capturing an image in the Y direction on the subject surface at a maximum view angle β in the Y-axis direction of the image sensor 21 (=2·D·TAN β), the error distance δ(θ, α, D) is expressed by Formula (5) as follows.

[Math. 5]

$$\delta(\theta, \alpha, D) = \{A - A'\} \times \frac{Ny}{2 \cdot D \cdot \tan(\beta)} \quad (5)$$
$$= [\{r \cdot \sin\theta - d \cdot (1 - \cos\theta)\} \cdot \tan\alpha +$$
$$d \cdot \sin\theta + r \cdot (1 - \cos\theta)] \times \frac{Ny}{2 \cdot D \cdot \tan\beta}$$

FIG. 5 illustrates an example of the error distance δ(θ, α, D) obtained by using the elevation angle α in the Y-axis direction and the subject distance D as parameters.

FIG. 5 illustrates the error distance δ(θ, α, D) obtained by using the elevation angle α in the Y-axis direction (0.00°, 5.00°, 10.00°, 15.00°, 20.00°, 25.0°) as a parameter in a column direction, and by using the subject distance D (25 cm, 50 cm, 1 m, 2 m, 3 m, 5 m) as a parameter in a row direction. Further, FIG. 5 illustrates an example of the error distance δ(θ, α, D) obtained when the maximum view angle β of the image sensor 21 is up and down 25°, the pixel count Ny in the Y direction of the image sensor 21 is 3000 pixels, and the rotational radius r is 50 mm.

Each numerical value of the error distance δ(θ, α, D) shown in FIG. 5 indicates the degree of difference in position where the distance difference (A−A') in the Y direction between the point A and the point A' on the subject surface appears as an image in the pixels of the image sensor 21.

Typically, when the distance difference between predetermined two points on the subject surface is 2 pixels or more on the sensor surface, the distance difference is said to be conspicuous. In FIG. 5, the range of the error distance δ(θ, α, D) of less than two pixels, that is, the range where the distance difference (A−A') in the Y direction between the point A and the point A' on the subject surface is less than two pixels on the sensor surface S is surrounded by the thick frame line. Accordingly, since the error distance δ(θ, α, D) is less than 2 pixels in a most region for the elevation angle α and the subject distance D shown in FIG. 5, the distance difference (A−A') is not sufficiently conspicuous, and can withstand practical use.

Further, the error distance δ(θ, α, D) is absolutely an error (error pixel count) at a certain moment, and it is moving in the accumulation period in a normal capturing, and the integration of all of the movement amounts is expressed as an image. Accordingly, a level of the error shown in FIG. 5 has no problem at all in a range used in normal capturing.

That is, the distance difference between the point A and the point A' on the subject surface can be assumed to be ignorable. Therefore, when the image-capturing device 11 shakes due to the camera shake in the capturing, and the sensor surface S is rotationally moved at the shake angle θ around the predetermined rotational center, a correction amount Δy in the y direction (vertical axis direction) can be obtained by Formula (6) as follows. As expressed by Formula (6), the correction amount Δy is different depending on the elevation angle α. Further, since the imaged height on the sensor surface of the point A on the subject surface is obtained from the elevation angle α, the correction amount Δy is different depending on the imaged height (a distance in the Y direction from the substantial center of the sensor surface S at which the point A on the subject surface positioned at the elevation angle α forms an image on the sensor surface S).

[Math. 6]

$$\Delta y = d \cdot (\tan\alpha - \tan(\alpha+\theta)) \quad (6)$$

Here, with reference to FIG. 6, there will be described the correction in the X direction (horizontal axis direction) in the rotational movement at the shake angle θ in this manner.

Figure 6:
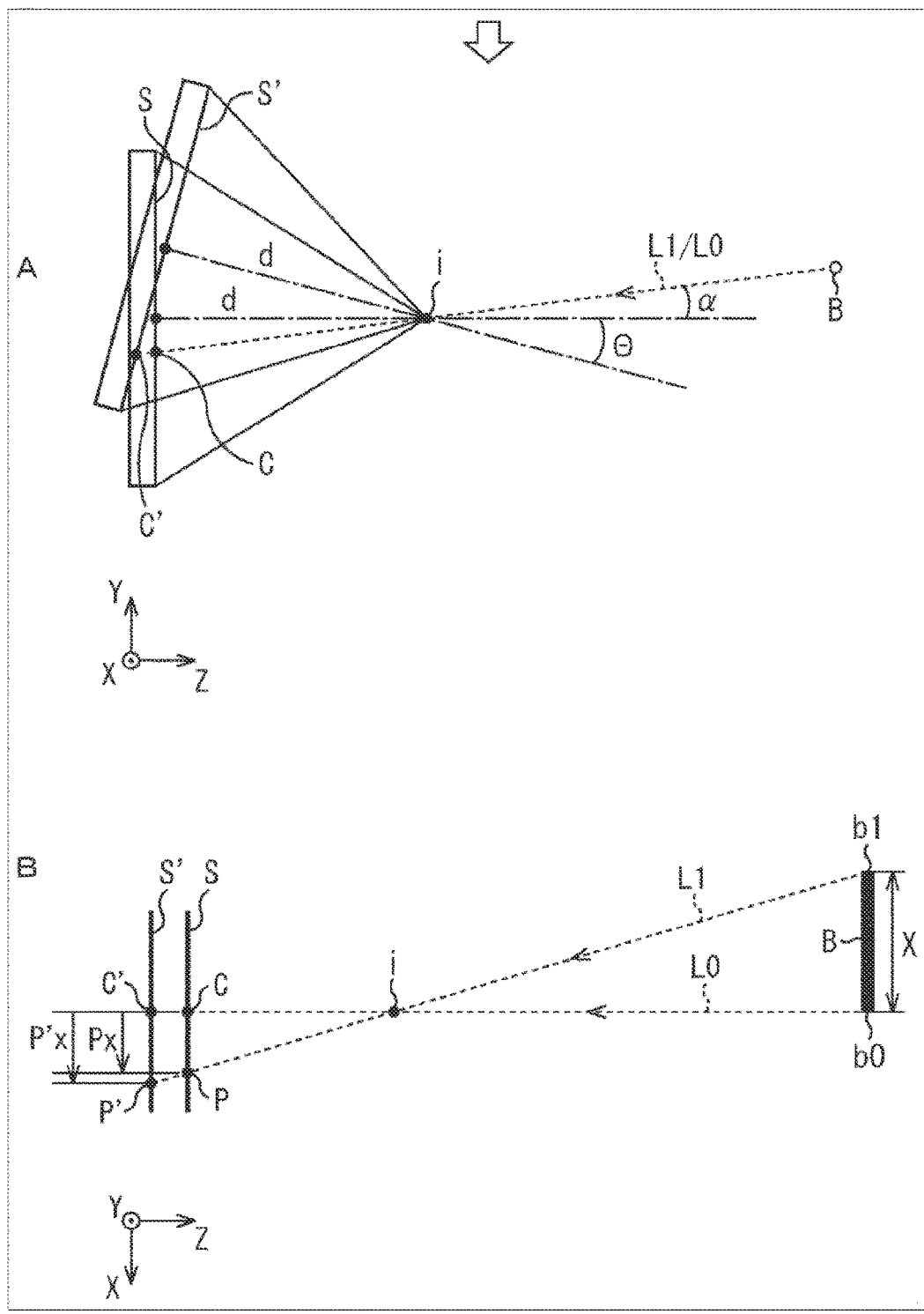
FIG. 6 is a diagram for explaining a correction in an X direction in rotational movement at a shake angle θ.

In FIG. 6, in order to indicate how the image is formed on the image surface of the sensor surface S in an easy-to-understand manner, a rod-shaped subject B arranged along the X-axis direction is used, and in order to make the description simple, a pupil position i is assumed to be not shifted by the shake of the image-capturing device 11.

A of FIG. 6 illustrates a diagram when viewed from the X-axis direction along the rod-shaped subject B, and B of FIG. 6 illustrates a diagram when viewed from the void arrow in A of FIG. 6, that is, viewed from the Y-axis direction.

As shown in FIG. 6, by the shake angle θ, light L0 entering the pupil position i from one end b0 of the rod-shaped subject B forms an image at a sensor center point C of the sensor surface S before the image-capturing device 11 shakes, and forms an image at a sensor center point C' of the sensor surface S' after the image-capturing device 11 has shaken. Therefore, on the sensor surface S and the sensor surface S', a distance from the pupil position i to the sensor center point C is d/COS α, and a distance from the pupil position i to the sensor center point C' is d/COS(α+θ), respectively.

Further, by the shake angle θ, light L1 entering the pupil position i from the other end b1 of the rod-shaped subject B forms an image at a point P of the sensor surface S before the image-capturing device 11 shakes, and forms an image at a point P' of the sensor surface S' after the image-capturing device 11 has shaken. At this time, the triangle formed by the pupil position i, the sensor center point C and the point P is similar to the triangle formed by the pupil position i, the sensor center point C' and the point P'. Therefore, a ratio between a value Px from the sensor center point C to the point P before the image-capturing device 11 shakes and a value P'x from the sensor center point C' to the point P' after the image-capturing device 11 has shaken is expressed by Formula (7) as follows.

[Math. 7]

$$Px : P'x = \frac{d}{\cos\alpha} : \frac{d}{\cos(\alpha+\theta)} \quad (7)$$

Therefore, according to Formula (7), when the image-capturing device 11 shakes by the camera shake in capturing, and the sensor surface S is rotationally moved at the shake angle θ around the predetermined rotational center, assuming that a pixel at the position P is a target for the correction, and a distance from the sensor center point C to the point P is X, a correction amount Δx in the X direction (horizontal axis direction) can be obtained by Formula (8) as follows. As expressed by Formula (8), the correction amount Δx is different depending on the elevation angle α and the distance X from the sensor center point C to the point P.

[Math. 8]

$$\Delta x = Px - P'x = X \cdot \left(1 - \frac{\cos\alpha}{\cos(\alpha+\theta)}\right) \quad (8)$$

Meanwhile, actually, the pupil position i is changed by the shake angle θ. Therefore, the position at which the end b1 of the rod-shaped subject B forms an image does not correspond to the position P' of the sensor surface S' as shown in FIG. 6.

Figure 7:
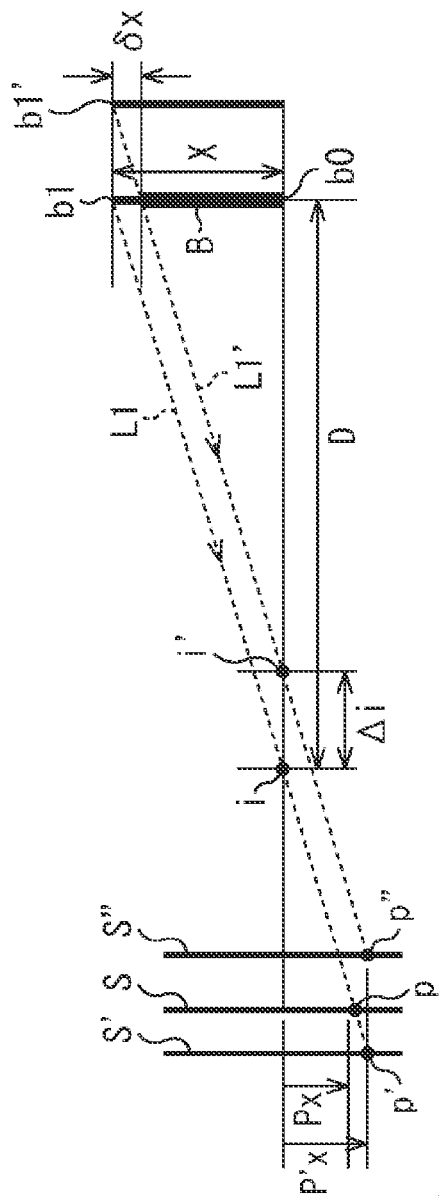
FIG. 7 is a diagram for explaining a change in pupil position by the shake angle θ.

Here, FIG. 7 is a diagram for explaining the position at which the end b1 of the rod-shaped subject B forms an image in consideration of a change in the pupil position i by the shake angle θ.

As shown in FIG. 7, when the image-capturing device 11 has shaken at the shake angle θ, the pupil position i comes close to the subject B by a pupil position movement amount Δi expressed in Formula (9) as follows.

[Math. 9]

$$\Delta i = r \cdot \text{SIN } \theta - d \cdot (1 - \cos \theta) \quad (9)$$

Therefore, when the image-capturing device 11 has shaken at the shake angle θ, a position of an end b1' of the subject B originally as a position of the end b1 forms an image at a point P" of a sensor surface S". A subject error δx in the X-axis direction in the subject B at this time is expressed by Formula (10) as follows.

[Math. 10]

$$\delta x = (r \cdot \text{SIN } \theta - d \cdot (1 - \cos \theta)) \cdot \text{TAN } q \quad (10)$$

However, TAN q=X/D is satisfied in Formula (10).

Here, similarly to the error distance δ(θ, α, D) in the Y direction shown in FIG. 5, the subject error δx in the X-axis direction is obtained. By using a pixel count Nx of a side in the X-axis direction of the image sensor 21, and a range capable of capturing an image in the X direction on the subject surface at a maximum view angle β in the X-axis direction of the image sensor 21 (=2·D·TAN β), the subject error δx is expressed by Formula (11).

[Math. 11]

$$\delta x = (r \cdot \text{SIN}\theta - d \cdot (1 - \cos\theta)) \cdot \text{TAN}q \times \frac{Nx}{2 \cdot D \cdot \text{TAN}\beta} \quad (11)$$

However, TAN q=X/D is satisfied in Formula (11).

FIG. 8 illustrates an example of the error distance δx obtained by using the elevation angle α in the X-axis direction and the subject distance D as parameters.

FIG. 8 illustrates the error distance δx obtained by using the elevation angle α in the X-axis direction (0.00°, 5.00°, 10.00°, 15.00°, 20.00°, 25.00°, 30.00°, 35.00°) as a parameter in the column direction, and by using the subject distance D (25 cm, 50 cm, 1 m, 2 m, 3 m, 5 m) as a parameter in the row direction. Further, FIG. 8 illustrates an example of the error distance δx obtained when the maximum view angle β of the image sensor 21 is left and right 35°, the pixel count Nx in the X direction of the image sensor 21 is 4000 pixels, and the rotational radius r is 50 mm.

Each numerical value of the error distance δx shown in FIG. 8 indicates the degree of difference in position where the distance difference in the X direction between the end b1 and the end b1' of the subject B appears as an image in the pixels of the image sensor 21.

Similarly to the error distance δ(θ, α, D) in the Y direction as described above, typically, when the distance difference between predetermined two points on the subject surface is 2 pixels or more, the distance difference is said to be conspicuous. In FIG. 8, the range of the error distance δx of less than two pixels, that is, the range where the distance difference in the X direction between the end b1 and the end b1' of the subject B is less than two pixels on the sensor surface S is surrounded by the thick frame line. Accordingly, since the error distance δx is less than 2 pixels in a most region for the elevation angle α and the subject distance D shown in FIG. 8, the distance difference can sufficiently withstand practical use.

Further, the error distance δx is absolutely an error (error pixel count) at a certain moment, and it is moving in the accumulation period in a normal capturing, and the integration of all of the movement amounts is expressed as an image. Accordingly, a level of the error shown in FIG. 8 has no problem at all in a range used usually.

Note that, in the above description, the shake (pitch) of being inclined to the front around the X-axis has been described, but the similar calculation is possible in the shake (yaw) of being inclined right and left in the Y-axis direction.

Figure 9:
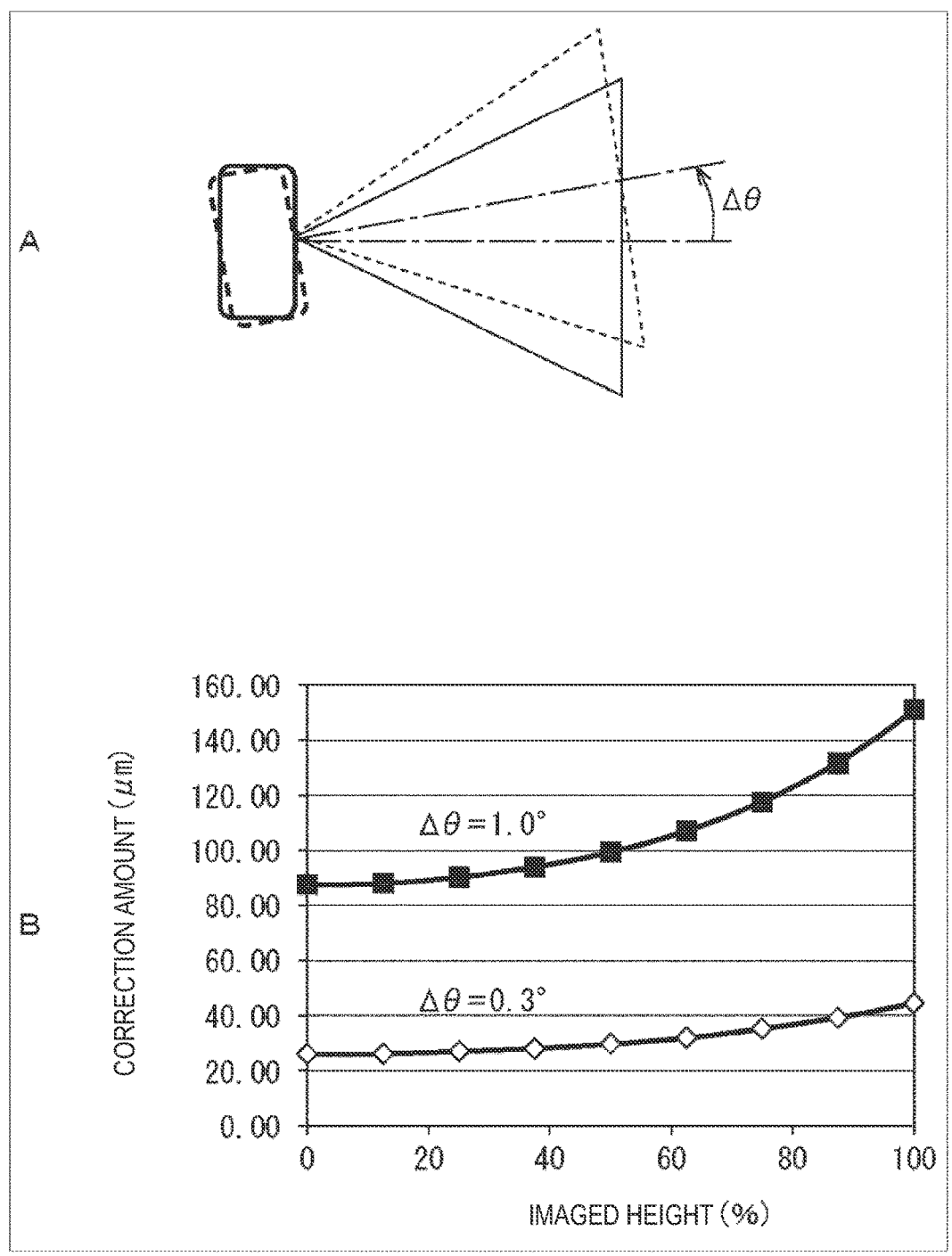
FIG. 9 is a diagram illustrating a relationship between an imaged height and a correction amount.

Here, B of FIG. 9 illustrates an example of a correction amount when the module including the optical system 12 and the image sensor 21 of FIG. 1 has shaken at the shake angle Δθ as shown in A of FIG. 9. Further, the correction amount is obtained by using the image sensor 21 having a pixel count of 13 million pixels, and a side of one pixel of 1.12 μm.

In B of FIG. 9, the horizontal axis represents an imaged height in the Y-axis direction, and the vertical axis represents a correction amount in the Y-axis direction. FIG. 9 illustrates that the correction amount is increased with the increasing imaged height in the Y-axis direction. Further, FIG. 9 illustrates 1.0° and 0.3° as the shake angle Δθ, and illustrates that the correction amount is increased with the increasing shake angle. Note that, in the optical camera shake correction of the barrel shift system, the whole image is uniformly corrected according to the correction amount at the center point of the image-capturing element, that is, a point of 0 on the horizontal axis in FIG. 9.

Therefore, the camera shake correction processing unit 25 of the image-capturing device 11 can effectively correct the distortion differentially occurring in the image according to the imaged height in the Y-axis direction by obtaining the correction amount according to the imaged height in the Y-axis direction to use the correction amount to correct the camera shake. The camera shake correction processing unit 25 of the image-capturing device 11 can effectively especially perform the correction in the end of the image.

Figure 10:
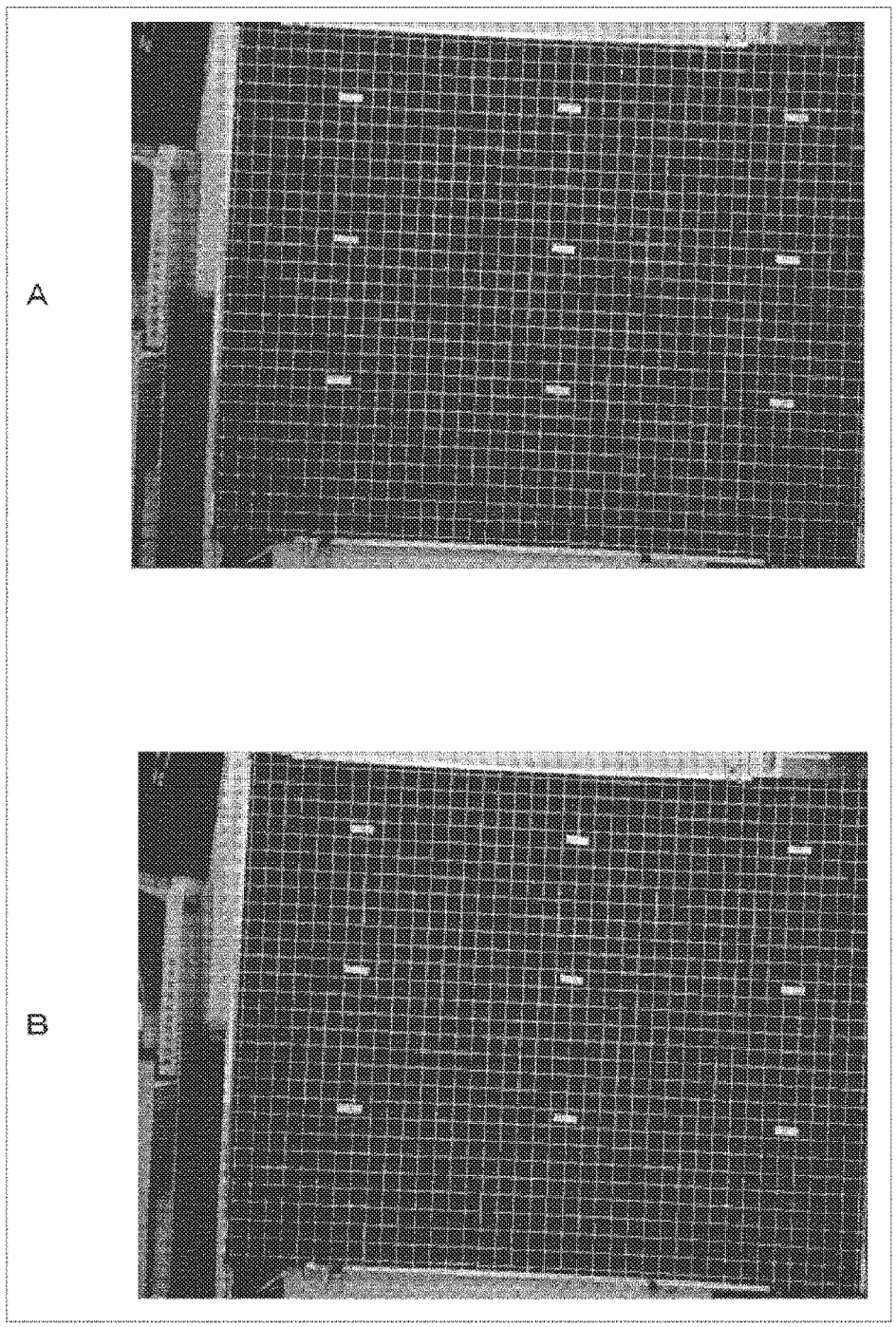
FIG. 10 is a diagram for explaining an effect of camera shake correction processing by comparison.
Figure 11:
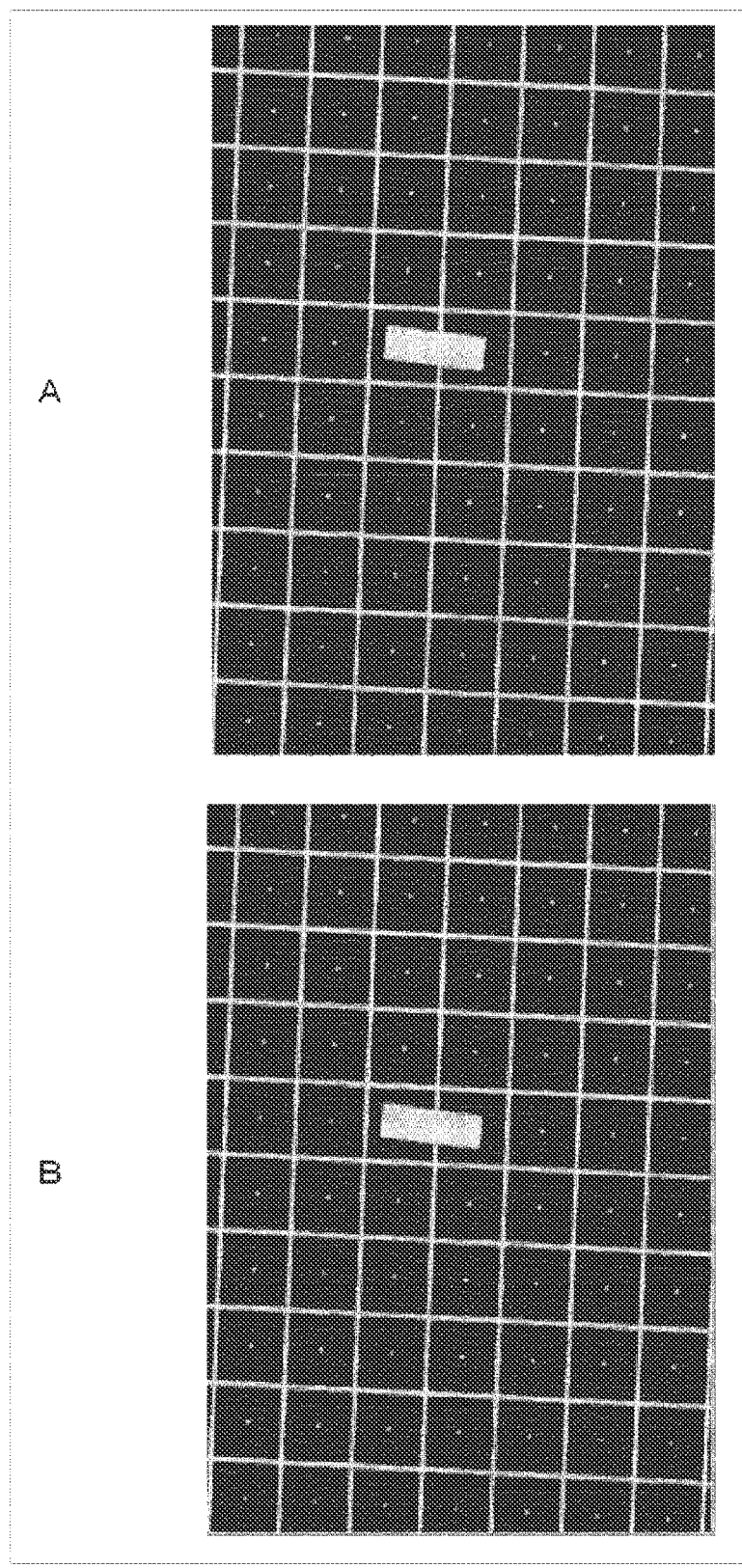
FIG. 11 is a diagram for explaining an effect of camera shake correction processing by comparison.
Figure 12:
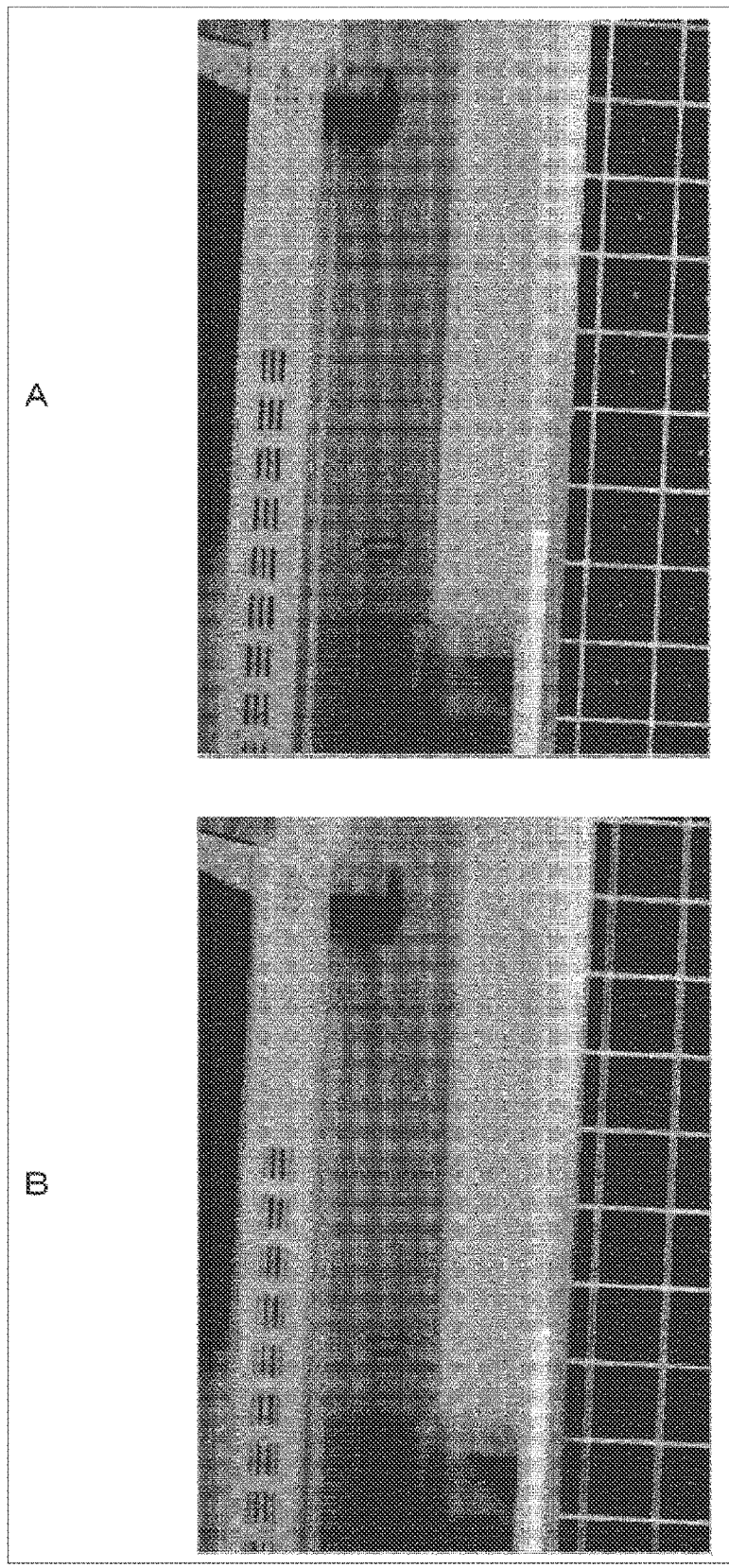
FIG. 12 is a diagram for explaining an effect of camera shake correction processing by comparison.

Here, FIG. 10 to FIG. 12 illustrate the image subjected to the camera shake correction processing by the image-capturing device 11 to which the present technology is applied and the image subjected to the existing optical camera shake correction of the barrel shift system in comparison with each other.

FIG. 10 illustrates the panel having a grating pattern obtained by overlapping the original image without the camera shake with the image inclined by 0.5°. A of FIG. 10 illustrates the image subjected to the camera shake correction processing by the image-capturing device 11 to which the present technology is applied, and B of FIG. 10 illustrates the image subjected to the existing optical camera shake correction of the barrel shift system. It is difficult to recognize a difference between the respective images from a distance as shown in FIG. 10.

FIG. 11 illustrates the image obtained by cutting out the vicinity of the center of the image of FIG. 10, and FIG. 12 illustrates the image obtained by cutting out the vicinity of the end of the image of FIG. 10. A of FIG. 11 and A of FIG. 12 illustrate the image subjected to the camera shake correction processing by the image-capturing device 11 to which the present technology is applied, and B of FIG. 11 and B of FIG. 12 illustrate the image subjected to the existing optical camera shake correction of the barrel shift system.

As shown in FIG. 11, it is difficult to recognize the difference between the respective images around the center of the image. In contrast, as shown in FIG. 12, it is possible to clearly recognize the difference between the respective images around the end of the image. That is, for the images subjected to the camera shake correction processing by the image-capturing device 11 to which the present technology is applied, the original image and the image corrected for the shake of 0.5° are matched even around the end. However, for the images subjected to the existing optical camera shake correction of the barrel shift system, the original image and the image corrected for the shake of 0.5° are viewed doubly.

In this manner, the images shown in FIG. 10 to FIG. 12 indicate that it is possible to more effectively correct the camera shake by applying the present technology. Especially, with the recent remarkable spread of a smartphone, it can be said that the present technology capable of capturing the shake that cannot be avoided due to a small size without structural disadvantages and easily capturing a high-quality image, has an extremely high industrial value as a function of the smartphone.

Meanwhile, in the image-capturing device 11, the camera shake correction processing unit 25 corrects the image captured by the image sensor 21 in terms of the part in the accumulation period, the degree of the shake and the direction of the shake. Therefore, the signal synchronization unit 23 needs to synchronize the gyro data (camera shake amount information) outputted from the gyro sensor 22 with the image data outputted from the image sensor 21.

Next, with reference to FIG. 13, the synchronization between the gyro data and the image data will be described.

Figure 13:
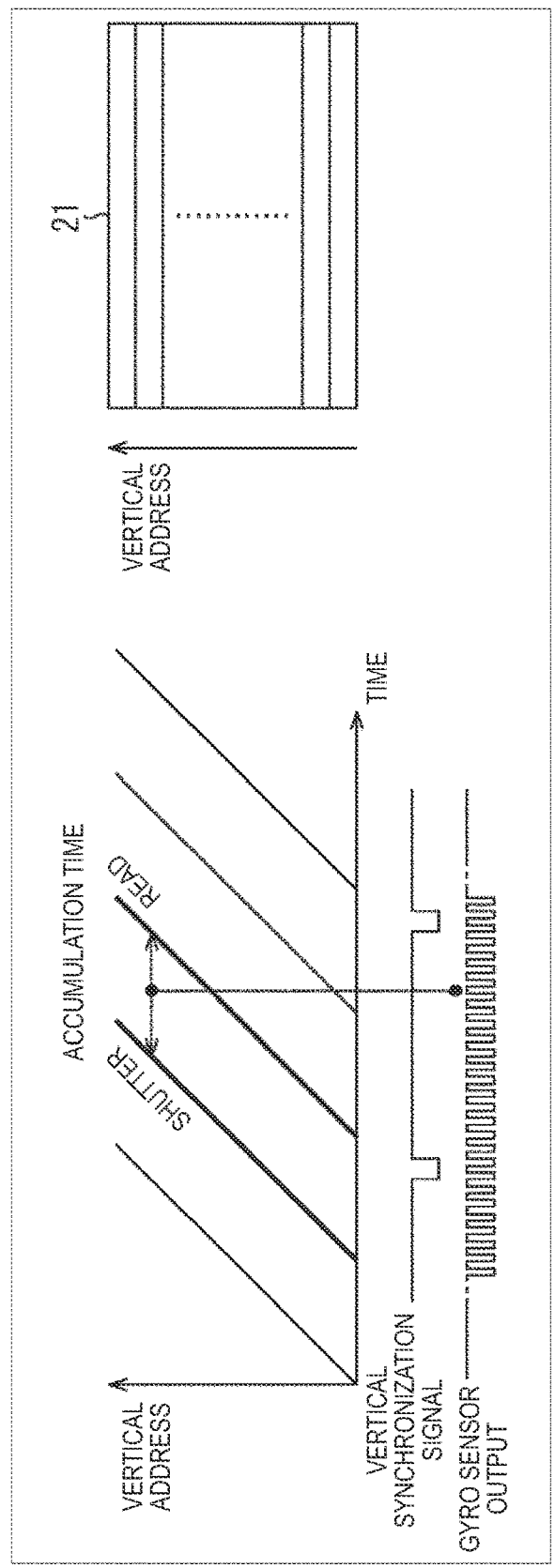
FIG. 13 is a diagram for explaining synchronization between gyro data and image data.

The right side of FIG. 13 illustrates reading of a signal from the image sensor 21. The image sensor 21 has a structure in which all the pixels in the horizontal direction are read out at one time with respect to one vertical address in the vertical direction. That is, the reading time is constant and the accumulation time is constant in one horizontal line.

Therefore, in the image sensor 21, the horizontal lines designated by the different vertical addresses are constantly read out, and the accumulation time for each horizontal line has different timing. However, the accumulation time as a time when a signal charge is accumulated in each pixel of the image sensor 21 is constant at all the pixels. Then, it is necessary to acquire the gyro data according to the timing of the accumulation time in each horizontal line. That is, the camera shake amount information indicating the degree of the shake amount occurring in the accumulation time is required.

The left side of FIG. 13 illustrates a processing example that the gyro data outputted from the gyro sensor 22 at the middle timing of an accumulation time T of a certain horizontal line is set as the gyro data in the horizontal line. Note that, without being limited to such processing, for example, there may be performed processing of setting the average value of the gyro data outputted during the accumulation time T of a certain horizontal line as the gyro data of the horizontal line. That is, the synchronized gyro data corresponding to each accumulation time for each horizontal line has only to be acquired.

For example, there is a method for synchronizing between the timing when the image data is outputted from the image sensor 21 and the timing when the gyro data is outputted from the gyro sensor 22. Further, there is a method for performing the synchronization by receiving the gyro data outputted from the gyro sensor 22 in such as a baseband chip outside the gyro sensor 22.

Specifically, there is used means for transmitting to the baseband chip command issuing timing to the image sensor 21 and a delay of the image data outputted according to the command. That is, since the image sensor 21 is typically driven according to a vertical synchronizing signal, the image sensor 21, even when receiving a command for changing an exposure time from the outside at any timing, cannot quickly reflect the command. Therefore, the image sensor 21 performs control according to the vertical synchronization signal when a frame after having received the command from the outside starts. Such control is performed to make an image-capturing condition identical in the frame. On the other hand, since the command is given from the outside of the image sensor 21, the command is issued at timing having nothing to do with the vertical synchronization signal. Further, the timing that the baseband chip can know is timing of command issuing to the image sensor 21 and timing of command issuing to the gyro sensor 22.

Figure 14:
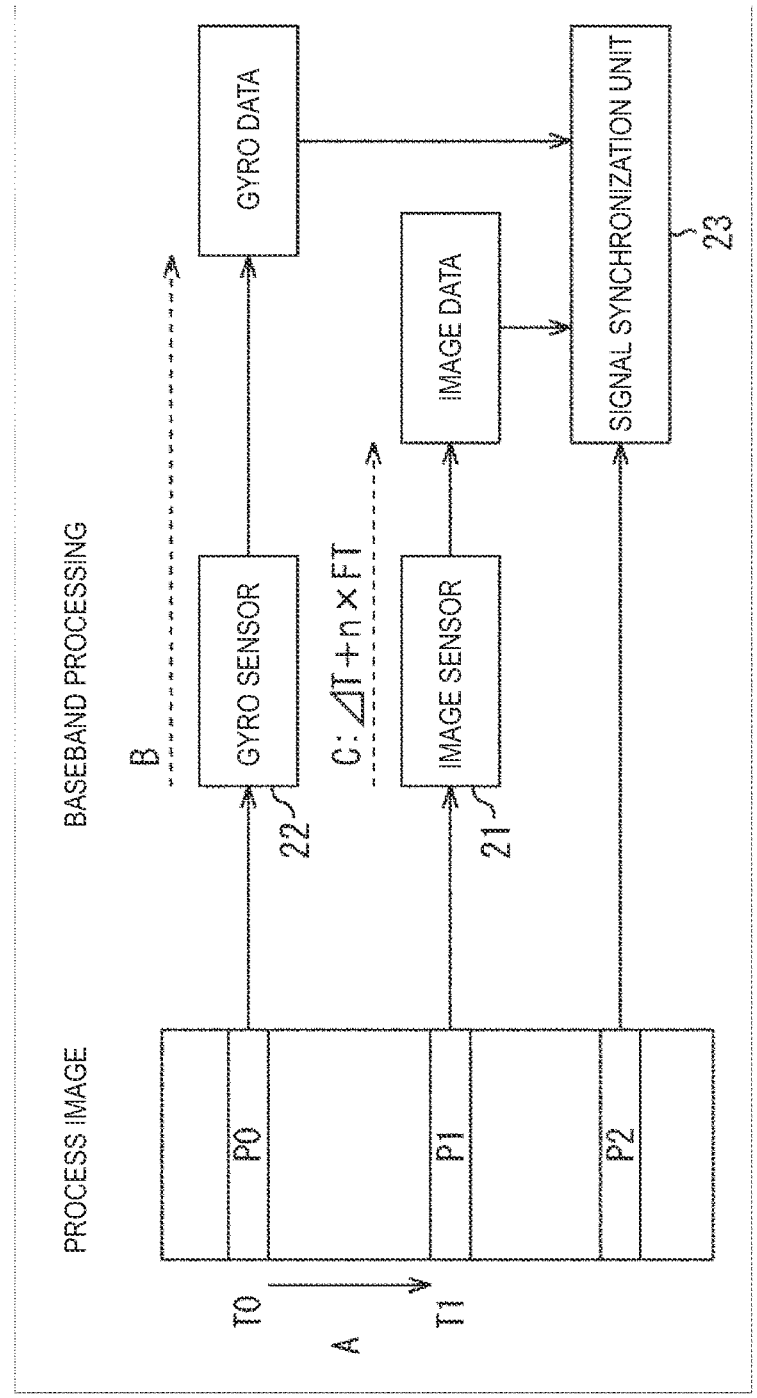
FIG. 14 is a diagram for explaining synchronization between gyro data and image data.

That is, as shown in FIG. 14, from a viewpoint of the baseband processing, the command to the image sensor 21 is outputted at the timing of a time T1, and the image sensor 21 that has received the command outputs the image data after n×F time (a frame image output time FT, an integer n: 1, 2, . . . ) through a synchronization time ΔT for performing the synchronization with the vertical synchronization signal therein. Therefore, this synchronization time ΔT is different depending on the input timing of the command to the image sensor 21.

On the other hand, the command for requesting data output to the gyro sensor 22 is outputted at the timing of a time T0 before the command to the image sensor 21 is requested, and the gyro sensor 22 side records the time T0 when it has received the command as a time stamp, and sequentially outputs the gyro data. Therefore, in a viewpoint of the baseband processing, it is possible to know the timing when all the gyro data is outputted.

At such timing, the image data and the gyro data is outputted and supplied to the signal synchronization unit 23, and the signal synchronization unit 23 performs the synchronization between the image data and the gyro data and outputs the synchronized data to the camera shake correction processing unit 25. Then, the camera shake correction processing is performed in the camera shake correction processing unit 25.

The camera shake correction processing performed in the camera shake correction processing unit 25 will be described below. Note that, in formulas represented in the following description, a different symbol may be used for the same object as that of the above description.

First, as a first processing example of the camera shake correction processing, there will be described the camera shake correction processing in a configuration in which the image-capturing element used in the image sensor 21 adopts the global shutter system.

In the global shutter system, since the whole captured image is recorded as an image nearly at the same time, unlike the rolling shutter system to be described later, the camera shake correction processing can be performed by using a pair of correction angles (a correction amount in the Y-axis direction and a correction amount in the X-axis-direction) for one image. That is, it is possible to correct an image having a positional shift by the camera shake to an image having no positional shift by using the pair of correction angles.

Note that, assuming that the exposure time is long and a plurality of pieces of the camera shake amount information (gyro data) is acquired during the exposure, the pair of correction angles can be determined using the average value of the plurality of pieces of the camera shake amount information. Alternatively, the pair of correction angles may be determined by using the camera shake amount information acquired at the timing of the center of the exposure time, or the camera shake amount information acquired at the necessary timing obtained by interpolation from the plurality of pieces of the camera shake amount information.

Figure 15:
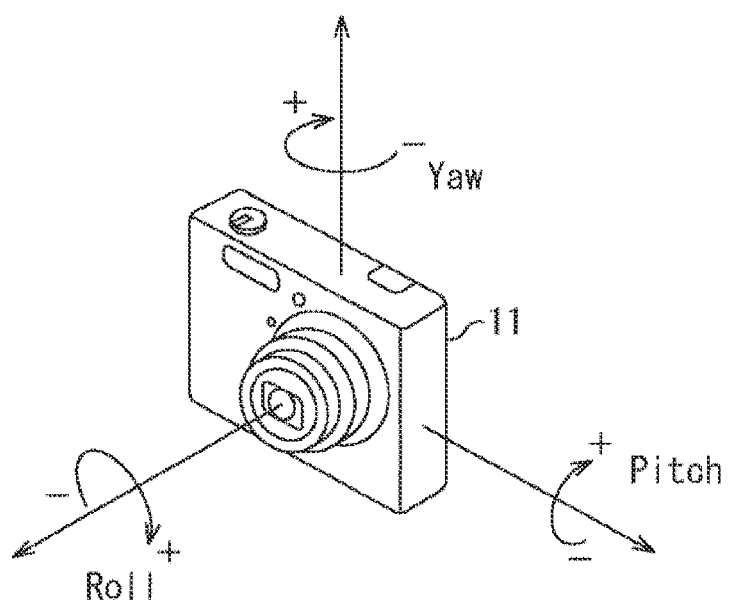
FIG. 15 is a diagram illustrating definition of a pitch angle, a yaw angle, and a roll angle.

First, as shown in FIG. 15, the shake of the image-capturing device 11 (that is, the shake of the image sensor 21 incorporated in the image-capturing device 11) is defined by a pitch angle, a yaw angle and a roll angle.

Figure 16:
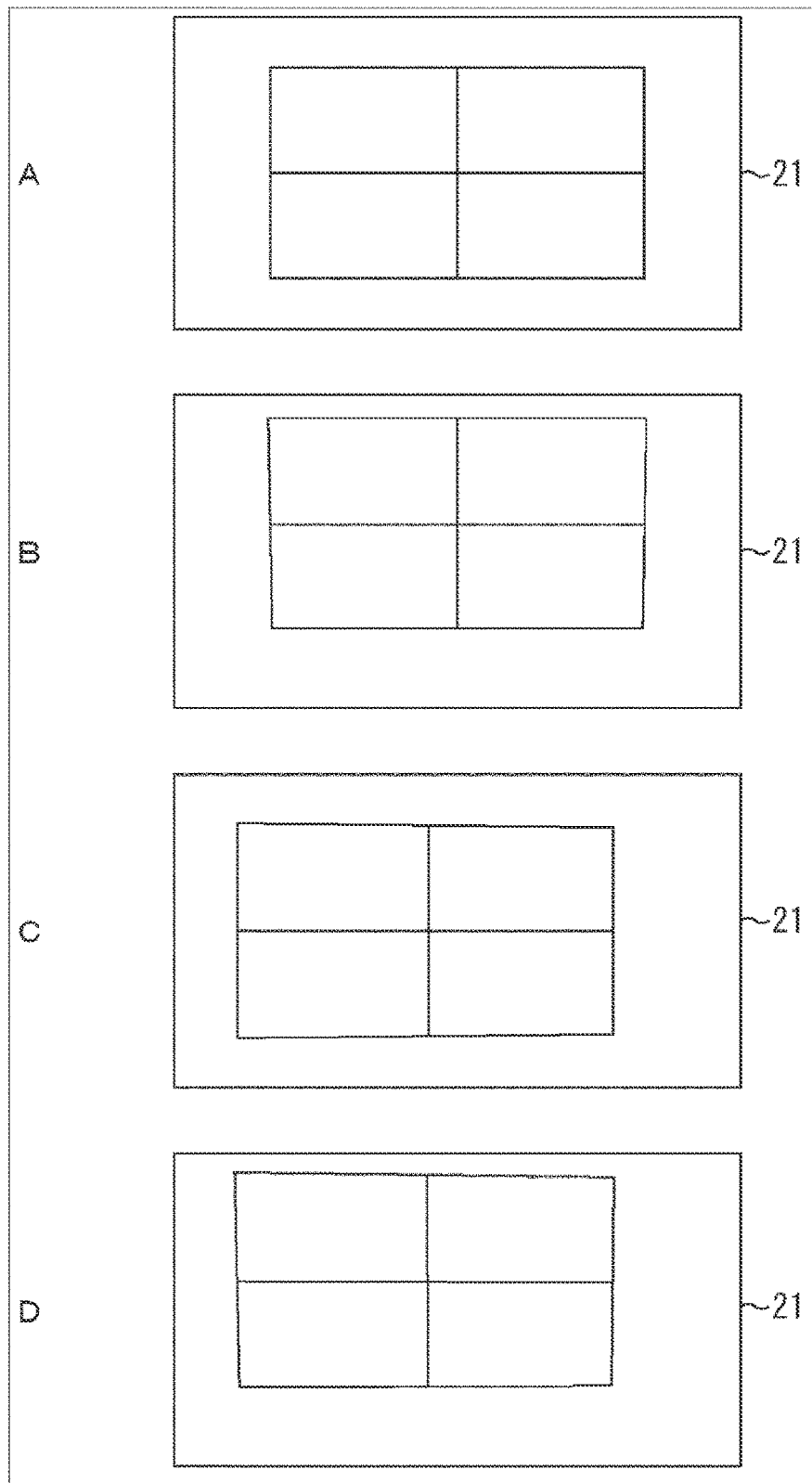
FIG. 16 is a diagram illustrating an effect on an image by the shake angle in an image sensor of a global shutter system.

FIG. 16 illustrates an effect on the image by the shake angle in the image sensor 21 of the global shutter system.

A of FIG. 16 illustrates a position of the image when the image sensor 21 is stationary. In this case, the image is positioned at the center of the image sensor 21.

B of FIG. 16 illustrates an effect on the image by the shake angle when the image sensor 21 has shaken in a minus direction of the pitch angle. In this case, mainly, the effect toward an upper side in the vertical direction (Y direction) of the image sensor 21 is given.

C of FIG. 16 illustrates an effect on the image by the shake angle when the image sensor 21 has shaken in a plus direction of the yaw angle. In this case, mainly, the effect toward a left side in the horizontal direction (X direction) of the image sensor 21 is given.

D of FIG. 16 illustrates an effect on the image by the shake angle when the image sensor 21 has shaken in the minus direction of the pitch angle and the plus direction of the yaw angle. In this case, mainly, the effect toward a direction obtained by adding the upper side in the vertical direction (Y direction) of the image sensor 21 to the left side in the horizontal direction (X direction) of the image sensor 21 is given.

Further, for the camera shake of the roll angle, the effect as the rotation of the image is given. Note that, when the shake angle of the image sensor 21 is θ, the effect of −θ is given on the image.

Meanwhile, in the existing camera shake correction processing, for the shake of the pitch angle, assuming that the whole image is uniformly shifted in the Y direction by Y1 pixels, processing such as moving the image by −Y1 pixels or shifting a reading position of the image by Y1 pixels has been performed. Similarly, for the shake of the yaw angle, in the existing camera shake correction processing, assuming that the whole image is uniformly shifted in the X direction by X1 pixels, processing such as moving the image by −X1 pixels or shifting a reading position of the image by X1 pixels has been performed.

Figure 17:
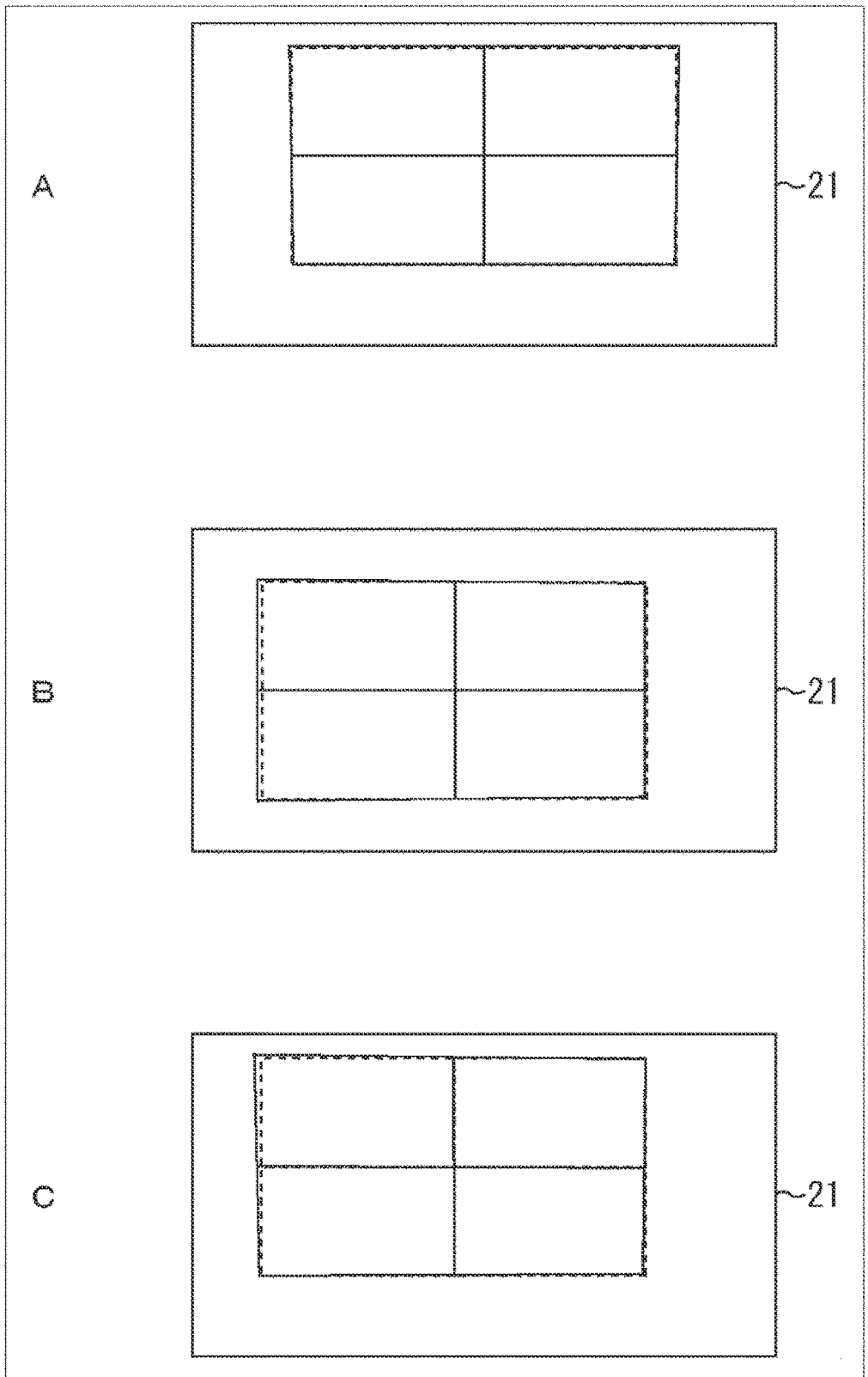
FIG. 17 is a diagram illustrating an effect on an image by the shake angle in an image sensor of a global shutter system.

However, as shown in FIG. 17, the whole image is not uniformly shifted for the shake angle. In FIG. 17, the solid line represents the obtained image, and the dotted line represents the image obtained by shifting the original image.

A of FIG. 17 illustrates an effect on the image by the shake angle when the image sensor 21 has shaken in the minus direction of the pitch angle. As shown A of FIG. 17, the effect different depending on the pixel position on the image is given. For example, around the upper end of the image, the movement is larger than around the center in the vertical direction, and is expanded in the horizontal direction. On the other hand, in the lower end of the image, such deformation that the movement amount in the vertical direction narrows unlike the upper end and around the center is obtained. That is, the movement amount in the Y direction and also in the X direction is different according to the position of each pixel.

B of FIG. 17 illustrates an effect on the image by the shake angle when the image sensor 21 has shaken in the plus direction of the yaw angle. As shown B of FIG. 17, the effect different depending on the pixel position on the image is given. For example, around the left end of the image, the movement is larger than around the center in the horizontal direction, and is expanded in the vertical direction. On the other hand, around the right end of the image, such deformation that the movement amount in the horizontal direction narrows unlike around the left end and around the center is obtained. That is, the movement amount in the X direction and also in the Y direction is different according to the position of each pixel.

C of FIG. 17 illustrates an effect on the image by the shake angle when the image sensor 21 has shaken in the minus direction of the pitch angle and in the plus direction of the yaw angle. As shown C of FIG. 17, when the effects of the shake in the two directions are superimposed, the image is deformed more complicatedly than A of FIG. 17 and B of FIG. 17.

Further, the addition of the shake of the roll angle causes the image to be deformed more complicatedly (not shown). Note that, since the effect of the roll angle is few and the correction processing often fails to be performed in the typical camera shake, mainly the shake of the pitch angle and the yaw angle will be described below.

The procedure of the camera shake correction in the global shutter system will be described below.

Here, for convenience of the description, the position of each pixel in the output image of the image sensor 21 is indicated so that, when the center of the bottom-left pixel is (0, 0), the center of the pixel that is the x-th from the left and the y-th from the bottom is coordinates A (x, y).

First, when a relative position (X, X) from coordinates O(x0, y0) of a point at which the optical-axis center of the lens of the optical system 12 of FIG. 1 forms an image on the image-capturing element of the image sensor 21 is obtained for the coordinates A (x, y), the coordinates A (X=x−x0, Y=y−y0) is obtained. Note that the coordinates O(x0, y0) may be substituted for the center of the image of the image-capturing element of the image sensor 21.

When the camera shake amounts in capturing the image are a pitch angle θp, a yaw angle θy, and a roll angle θr, and coordinates A' are obtained by shaking the coordinates A by a pitch angle −θp, a yaw angle −θy, and a roll angle −θr, the pixel value corrected for the camera shake is obtained by setting the pixel value of the coordinates A' in the input image to the pixel value of the coordinates A in the output image. Therefore, when this pixel value is set as the value of the coordinates A, and the image obtained for all the pixels of the image sensor 21 is set as the output image, the image corrected for the camera shake is outputted.

In order to obtain the coordinates A' in the input image, for the effective pixels of the image sensor 21, when a pixel count in the horizontal direction is W, a pixel count in the vertical direction is H, a distance from the lens center of the optical system 21 to the image-capturing element of the image sensor 21 is L (corresponding to the pixel count), and ½ of a view angle in the horizontal direction is an angle β, and assuming that the coordinates O(x0, y0) is the center of the effective pixels of the image sensor 21, the angle β as ½ of the view angle in the horizontal direction is obtained according to Formula (12) as follows.
[Math. 12]

$$\tan \beta = (W/2)/L \quad (12)$$

Therefore, the distance L (corresponding to the pixel count) from the lens center of the optical system 21 to the image-capturing element of the image sensor 21 can be obtained by Formula (13) as follows.
[Math. 13]

$$L = (W/2)/\tan \beta \quad (13)$$

Note that the angle β as ½ of the view angle in the horizontal direction and the distance L (corresponding to the pixel count) are a value specific to the image-capturing mode of the image-capturing device 11 (for example, an image-capturing mode of outputting all the pixels, an image-capturing mode of outputting the thinned pixels, and an image-capturing mode of outputting a cut-out part of the pixels), the image-capturing element of the image sensor 21, and the lens of the optical system 12.

At this time, an angle αp in the pitch direction at the position of the coordinates A, and an angle αy in the yaw direction at the position of the coordinates A are expressed by Formula (14) as follows.
[Math. 14]

$$\tan \alpha p = Y/L$$

$$\tan \alpha y = X/L \quad (14)$$

Therefore, when the image-capturing device 11 has shaken by the pitch angle θp, at the center position of the image, the pixel position is moved in the Y direction by L·tan(−θp) pixels. And in the position of the coordinates A, the pixel position is moved in the Y direction by a Y-direction movement amount ΔYp expressed by Formula (15) as follows.
[Math. 15]

$$\Delta Yp = L \cdot (\tan(\alpha p + (-\theta p)) - \tan \alpha p) \quad (15)$$

At this time, as described above with reference to FIG. 6 and FIG. 7, the pixel position is moved in the X direction as well as in the Y direction. Assuming that an X coordinate as the destination has a relationship expressed by Formula (16) as follows, the coordination is set L2/L1 times in the X direction as expressed by Formula (17) as follows.
[Math. 16]

$$L/L1 = \cos \alpha p$$

$$L/L2 = \cos(\alpha p + (-\theta p)) \quad (16)$$

[Math. 17]

$$L2/L1 = \cos \alpha p / \cos(\alpha p + (-\theta p)) \quad (17)$$

Therefore, the X coordinate is moved to the position expressed by Formula (18) as follows, and an X coordinate movement amount ΔXp is obtained by Formula (19) as follows.
[Math. 18]

$$X \cdot \cos \alpha p / \cos(\alpha p + (-\theta p)) \quad (18)$$

[Math. 19]

$$\Delta Xp = X \cdot (\cos \alpha p / \cos(\alpha p + (-\theta p)) - 1) \quad (19)$$

Similarly to the case of the shake by the pitch angle θp, when the image-capturing device 11 has shaken by the yaw angle θy, at the center position of the image, the pixel position is moved in the X direction by L·tan(−θy) pixels. And in the position of the coordinates A, the pixel position is moved in the X direction by an X-direction movement amount ΔXy expressed by Formula (20) as follows.
[Math. 20]

$$\Delta Xy = L \cdot (\tan(\alpha y + (-\theta y)) - \tan \alpha y) \quad (20)$$

Further, similarly, the pixel position is moved in the Y direction as well as in the X direction. When a Y coordinate as the destination has a relationship expressed by Formula (21) as follows, the coordination is set L4/L3 times in the Y direction as expressed by Formula (22) as follows.
[Math. 21]

$$L/L3 = \cos \alpha y$$

$$L/L4 = \cos(\alpha y + (-\theta y)) \quad (21)$$

[Math. 22]

$$L4/L3 = \cos \alpha y / \cos(\alpha y + (-\theta y)) \quad (22)$$

Therefore, the Y coordinate is moved to the position expressed by Formula (23), and a Y-coordinate movement amount ΔYy is obtained by Formula (24) as follows.

[Math. 23]

$$Y \cdot \cos \alpha y/\cos(\alpha y+(-\theta y)) \quad (23)$$

[Math. 24]

$$\Delta Yy = Y \cdot (\cos \alpha y/\cos(\alpha y+(-\theta y))-1) \quad (24)$$

Further, when the image-capturing device 11 has shaken by the roll angle θr, at the center position of the image as the rotation center, the pixel position is moved to the position expressed by Formula (25) as follows, and an X-direction movement amount ΔXr and a Y-coordinate movement amount ΔYr can be obtained by Formula (26) as follows.

[Math. 25]

$$X \cdot \cos(-\theta r) - Y \cdot \sin(-\theta r), X \cdot \sin(-\theta r) + Y \cdot \cos(-\theta r) \quad (25)$$

[Math. 26]

$$\Delta Xr = X \cdot \cos(-\theta r) - Y \cdot \sin(-\theta r) - X$$

$$\Delta Yr = X \cdot \sin(-\theta r) + Y \cdot \cos(-\theta r) - Y \quad (26)$$

The effects of the camera shake can be individually calculated for the angles in the three directions of the pitch angle θp, the yaw angle θy, and the roll angle θr, respectively. Meanwhile, since these effects interact, essentially, it is necessary to obtain the effects of the camera shake by the pitch angle θp, the yaw angle θy, and the roll angle θr at the same time, but it is possible to achieve the correction at a level causing no problem in a practical use even when the effects are simply obtained as follows. For example, sequentially, the movement amount due to the effect of the yaw angle θr may be obtained on the basis of the movement amount due to the effect of the pitch angle θp, and then the movement amount due to the effect of the roll angle θr may be obtained on the basis of the obtained movement amount. Note that, when obtaining the movement amounts, the order of the pitch angle θp, the yaw angle θy, and the roll angle θr may be changed. Further, the results obtained by individually calculating the effects of the camera shake for the pitch angle θp, the yaw angle θy, and the roll angle θr may be added together.

Meanwhile, since the pitch angle θp, the yaw angle θy, and the roll angle θr of the camera shake are a small angle of within plus or minus 1 degree, the difference between these calculation results is a very small value and ignorable.

Here, as the simplest method, the results obtained by individually calculating the effects of the camera shake for the pitch angle θp, the yaw angle θy, and the roll angle θr are added together, and then a comprehensive X-direction movement amount ΔX and a comprehensive Y-direction movement amount ΔY will be obtained by Formula (27) as follows.

[Math. 27]

$$\Delta X = \Delta Xp + \Delta Xy + \Delta Xr$$

$$\Delta Y = \Delta Yp + \Delta Yy + \Delta Yr \quad (27)$$

Therefore, the X coordinate X' of the coordinates A' to be obtained can be obtained by Formula (28) as follows, and the Y coordinate Y' of the coordinates A' to be obtained can be obtained by Formula (29) as follows.

[Math. 28]

$$X' = \Delta X + X \quad (28)$$
$$= X \cdot (\cos \alpha p / \cos(\alpha p + (-\theta p)) - 1) +$$
$$L \cdot (\tan(\alpha y + (-\theta y)) - \tan \alpha y) +$$
$$X \cdot \cos(-\theta r) - Y \cdot \sin(-\theta r) - X + X$$

[Math. 29]

$$Y' = \Delta Y + Y \quad (29)$$
$$= L \cdot (\tan(\alpha p + (-\theta p)) - \tan \alpha y) +$$
$$Y \cdot (\cos \alpha y / \cos(\alpha y + (-\theta y)) - 1) +$$
$$X \cdot \sin(-\theta r) + Y \cdot \cos(-\theta r) - Y + Y$$

Further, since the coordinates A(X, Y) has a relationship expressed by Formula (30) as follows, an X' coordinate and a Y' coordinate of the coordinates A' are expressed by Formula (31) as follows.

[Math. 30]

$$X = L \cdot \tan \alpha y$$

$$Y = L \cdot \tan \alpha p \quad (30)$$

[Math. 31]

$$X' = X \cdot \cos \alpha p/\cos(\alpha p + (-\theta p)) + L \cdot \tan(\alpha y + (-\theta y)) + X \cdot \cos(-\theta r) - Y \cdot \sin(-\theta r) - 2X$$

$$Y' = L \cdot \tan(\alpha p + (-\theta p)) + Y \cdot \cos \alpha y/\cos(\alpha y + (-\theta y)) + X \cdot \sin(-\theta r) + Y \cdot \cos(-\theta r) - 2Y \quad (31)$$

Here, since the coordinates A'(X', Y') is a relative position from the coordinates O(x0, y0), a value of the coordinates A'(x', y') in the output image can be read on the basis of Formula (32) as follows.

[Math. 32]

$$x' = X' + x0$$

$$y' = Y' + y0 \quad (32)$$

Then, when the processing of obtaining the coordinates A'(x', y') in the output image for all the pixels, the corrected image corrected for the camera shake can be acquired. In this manner, when the camera shake correction processing of this embodiment is applied to the image captured by the image-capturing element adopting the global shutter system, it is possible to perform the camera shake correction processing by using the pair of correction angles for one image, and effectively perform the camera shake correction at a small processing load.

Next, as a second example of the camera shake correction processing, there will be described the camera shake correction processing in a configuration in which the image-capturing element used in the image sensor 21 adopts the rolling shutter system.

In the image-capturing element of the rolling shutter system, since the image capturing timing is different for each horizontal line within the captured image, the deformation of the image becomes more complicated than that in the global shutter system. This is because of the effect of the change in shake angle with time in addition to the distortion of the image by the shake angle.

Figure 18:
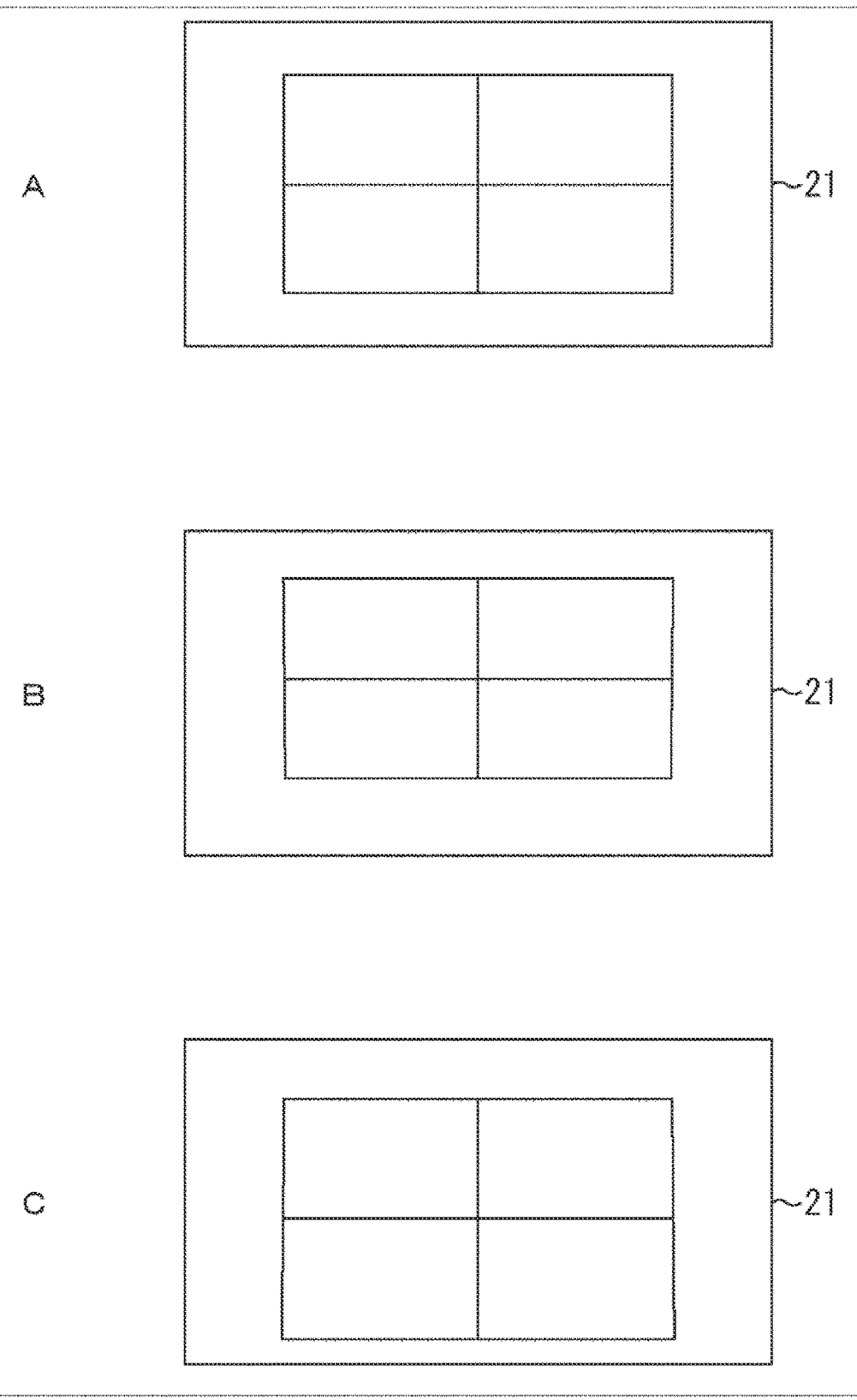
FIG. 18 is a diagram illustrating an effect on an image by the shake angle in an image sensor of a rolling shutter system.
Figure 19:
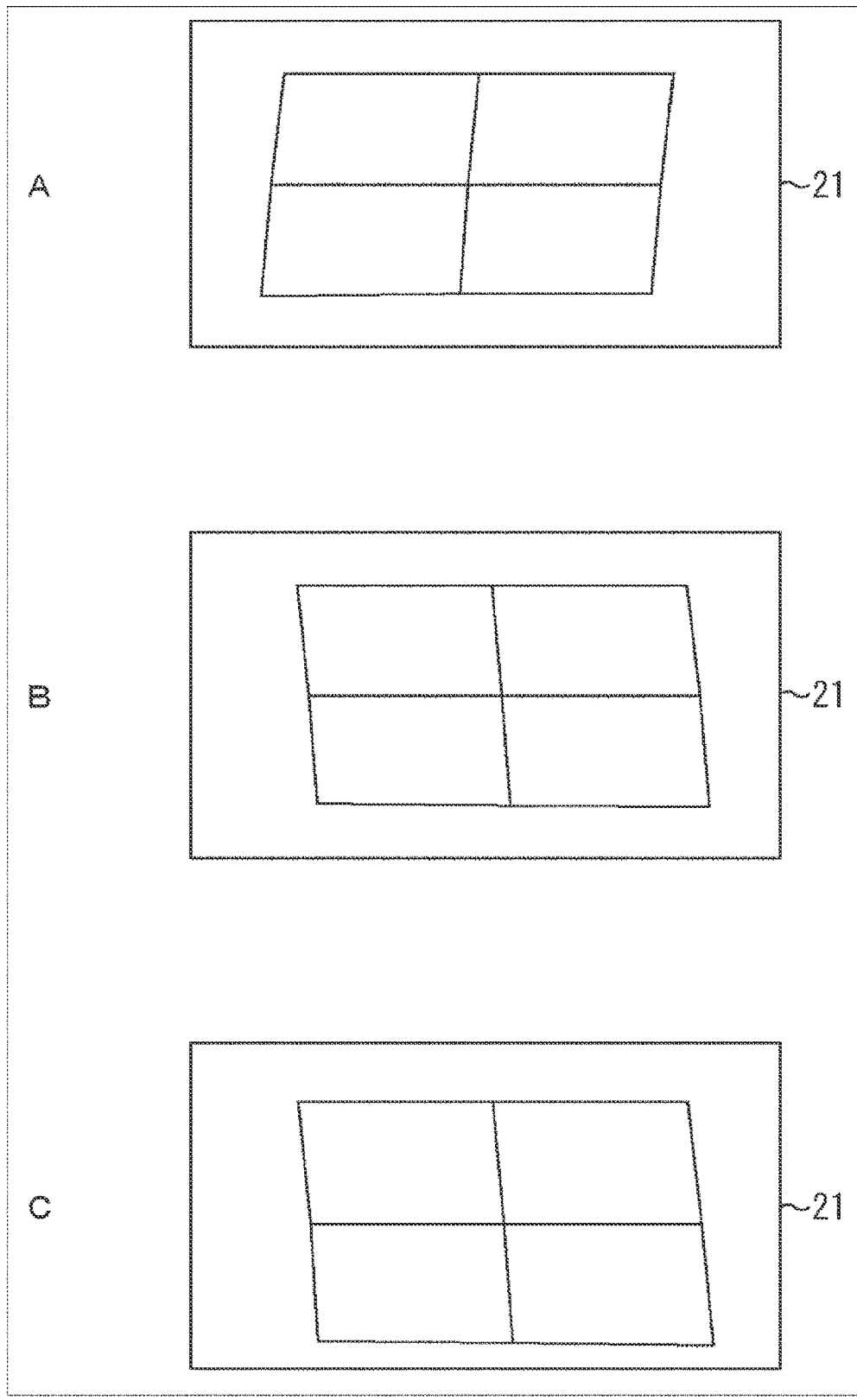
FIG. 19 is a diagram illustrating an effect on an image by the shake angle in an image sensor of a rolling shutter system.

For example, FIG. 18 and FIG. 19 illustrate the effect on the image by the shake angle in the image sensor 21 of the rolling shutter system.

A of FIG. 18 illustrates the position of the image when the image sensor 21 is stationary, and in this case the image is positioned at the center of the image sensor 21.

B of FIG. 18 illustrates the effect on the image by the shake angle when the image sensor 21 has shaken in a minus direction of the pitch angle. C of FIG. 18 illustrates the effect on the image by the shake angle when the image sensor 21 has shaken in a plus direction of the pitch angle. Further, A of FIG. 19 illustrates the effect on the image by the shake angle when the image sensor 21 has shaken in a plus direction of the yaw angle. B of FIG. 19 illustrates the effect on the image by the shake angle when the image sensor 21 has shaken in a minus direction of the yaw angle. Further, C of FIG. 19 illustrates the effect on the image by the shake angle when the image sensor 21 has shaken in the plus direction of the pitch angle and the minus direction of the yaw direction.

As shown in FIG. 18 and FIG. 19, in the rolling shutter system, compared with the global shutter system, in the shake in the minus direction of the pitch angle, a change in which the image shrinks in the Y direction is applied, and in the shake in the plus direction of the pitch angle, a deformation in which the image extends in the Y direction is applied. Further, in the shake of the yaw angle, a deformation in which the shake becomes large to an opposite side of the shake toward the lower side of the image is applied.

Figure 20:
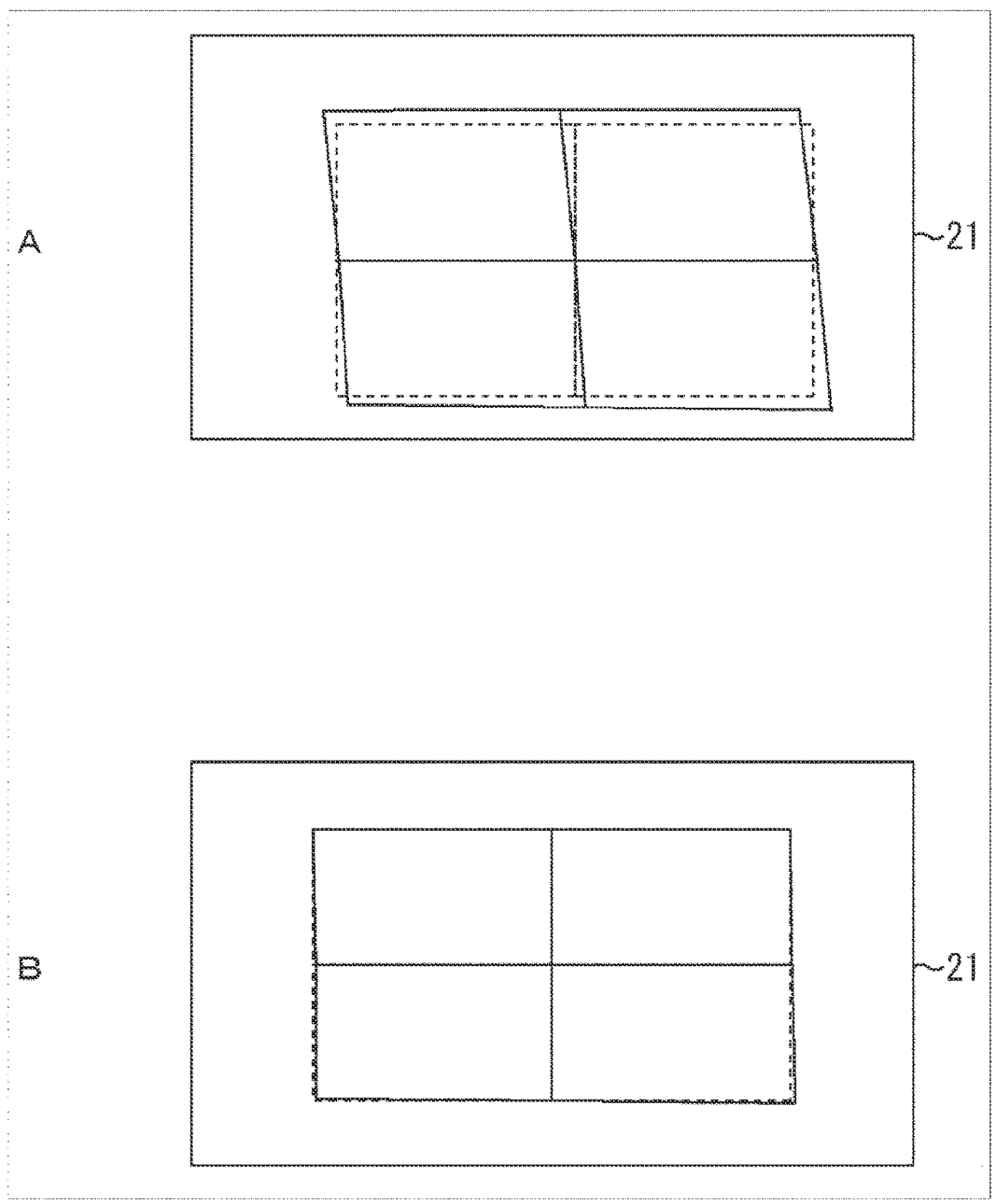
FIG. 20 is a diagram illustrating an effect on an image by the shake angle in an image sensor of a rolling shutter system.

A of FIG. 20 illustrates the effect on the image by the shake angle when the image sensor 21 has shaken in the minus direction of the pitch angle and the plus direction of the yaw angle. In A of FIG. 20, the solid line represents the obtained image, and the dotted line represents the image obtained by shifting the position of the original image. As described above, when the two shakes has occurred at the same time, the deformation becomes more complicated.

B of FIG. 20 illustrates the effect on the image by the shake angle when the image sensor 21 has shaken in the minus direction of the pitch angle and the plus direction of the yaw angle, in the correction of only the focal plane effect without considering the pixel position dependency. In B of FIG. 20, the solid line represents the obtained image, and the dotted line represents the image obtained by shifting the position of the original image. Even when such correction is performed, as shown in the drawing, it is impossible to fully correct the distortion of the image. Note that, although the distortion of the image shown in B of FIG. 20 looks small, the distortion becomes large in the periphery of the image, and the effect shown in FIG. 17 would appear depending on the condition of the camera shake.

The procedure of the camera shake correction in the rolling shutter system will be described below.

In order to correct the effect of the rolling shutter, it is necessary to perform the camera shake correction processing by using the shake angle when capturing a line for each line. Therefore, in the signal synchronization unit 23, it is desirable to perform the synchronization of the camera shake amount information for each line for each image. However, the current gyro sensor 22 can detect the camera shake amount information only one time in the plurality of lines.

Therefore, it is possible to adopt methods using the same camera shake amount information in the plurality of lines, or using the camera shake amount information obtained by the interpolation for each line, or using the same camera shake amount information in the plurality of lines and calculating the correction angle in consideration of the time shift in the calculation of the correction angle. Further, the correction angle for each line is obtained by using one of these methods or another method, and this angle is used to perform the same calculation as the calculation of the coordinates A' in the input image described above, and the coordinate position to be obtained is acquired to form the corrected image. In this case, the pitch angle θp, the yaw angle θy and the roll angle θr in synchronization with that line are used.

Next, as a third example of the camera shake correction processing, there will be described the processing in combination with the optical camera shake correction of the barrel shift system. It is possible to correct the distortion in the periphery of the image (uncorrected part in the periphery) in the barrel shift system by combining the camera shake correction processing as described above with the barrel shift system.

Figure 21:
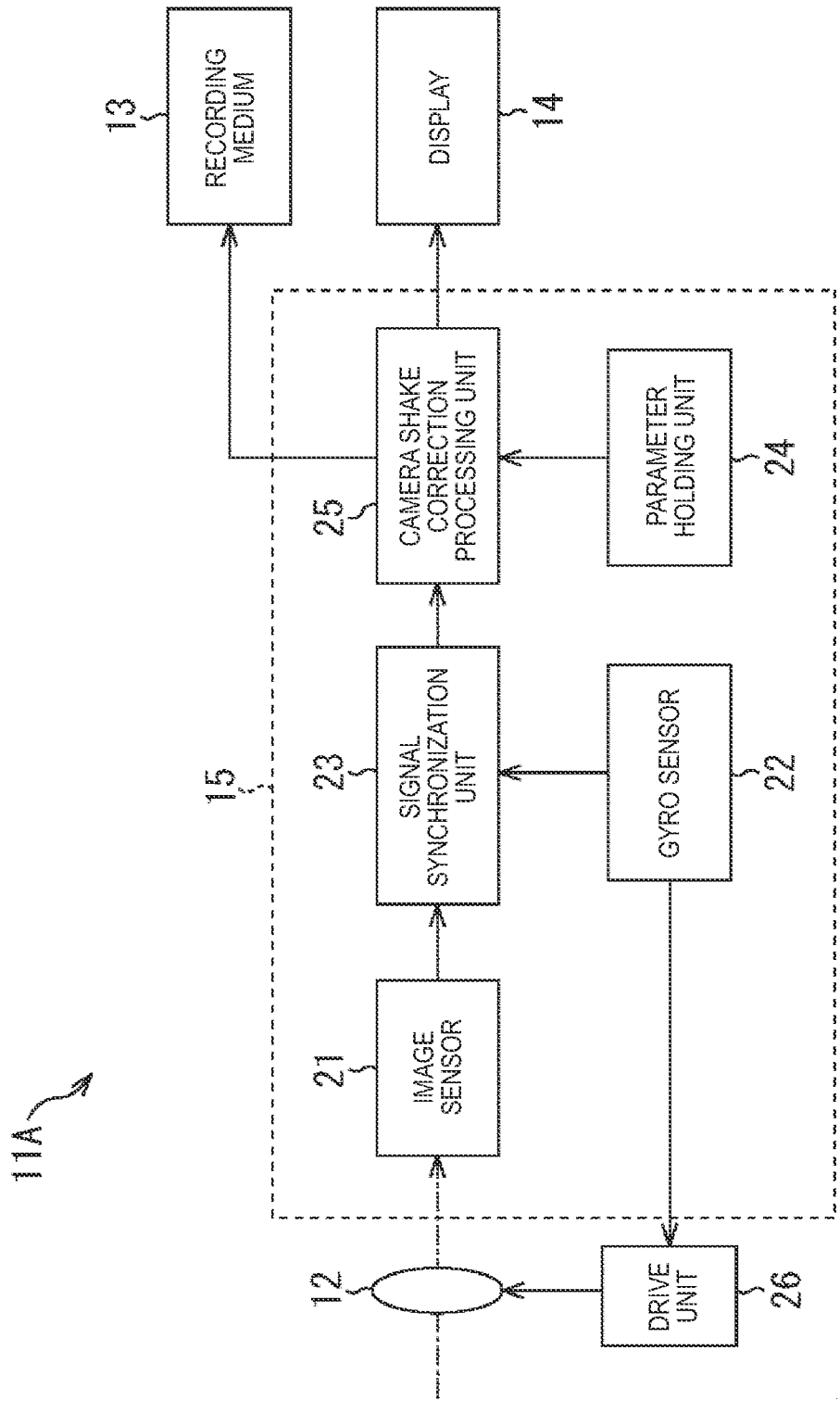
FIG. 21 is a diagram illustrating a configuration example of an image-capturing device including a camera shake correction function using a barrel shift system.

FIG. 21 illustrates an image-capturing device 11A including the optical camera shake correction of the barrel shift system. Note that, in the image-capturing device 11A of FIG. 21, structural elements in common with the image-capturing device 11 of FIG. 1 are denoted with the same reference numerals, and detailed explanation of these structural elements is omitted.

As shown in FIG. 21, the image-capturing device 11A includes a drive unit 26 in addition to the configuration of the image-capturing device 11 of FIG. 1. The drive unit 26 optically corrects the camera shake by driving the lens of the optical system 12 in parallel with the sensor surface of the image-capturing element of the image sensor 21 in the direction in which the image on the image-capturing element is not moved, on the basis of the camera shake amount information from the gyro sensor 22.

Meanwhile, in the optical camera shake correction of the barrel shift system, since the lens of the optical system 12 is moved by a fixed amount according to the camera shake amount, the dependency of the pixel position is not considered. Therefore, the image substantially identical to the image uniformly corrected for the whole image by the positional shift at the image center is obtained. Therefore, it is possible to correct the distortion in the periphery of the corrected image by the barrel shift by using the camera shake information used for the control of the barrel shift to correct, for each pixel, the movement amount as the remaining amount obtained by subtracting the positional shift at the image center from the movement amount of each pixel at the time of the camera shake (pixel position dependency amount).

In order to obtain the coordinates A' in the input image, for the effective pixels of the image sensor 21, when a pixel count in the horizontal direction is W, a pixel count in the vertical direction is H, a distance from the lens center of the optical system 21 to the image-capturing element of the image sensor 21 is L (corresponding to the pixel count), and ½ of a view angle in the horizontal direction is an angle β, and assuming that the coordinates O(x0, y0) is the center of the effective pixels of the image sensor 21, the angle β as ½ of the view angle in the horizontal direction is obtained according to Formula (12) described above.

Therefore, the distance L (corresponding to the pixel count) from the lens center of the optical system 21 to the image-capturing element of the image sensor 21 can be obtained by Formula (13) described above.

Note that the angle β as ½ of the view angle in the horizontal direction and the distance L (corresponding to the pixel count) are a value specific to the image-capturing mode of the image-capturing device 11 (for example, an image-capturing mode of outputting all the pixels, an image-capturing mode of outputting the thinned pixels, and an image-capturing mode of outputting a cut-out part of the pixels), the image-capturing element of the image sensor 21, and the lens of the optical system 12.

At this time, an angle αp in the pitch direction at the position of the coordinates A, and an angle αy in the yaw direction at the position of the coordinates A are expressed by Formula (14) described above.

Therefore, when the image-capturing device 11 has shaken by the pitch angle θp, at the center position of the image, the pixel position is moved in the Y direction by $L \cdot \tan(-\theta p)$ pixels. And in the position of the coordinates A, the pixel position is moved in the Y direction by a Y-direction movement amount ΔYp expressed by Formula (15) described above.

At this time, as described above with reference to FIG. 6 and FIG. 7, the pixel position is moved in the X direction as well as in the Y direction. When an X coordinate as the destination has a relationship expressed by Formula (16) described above, the coordination is set L2/L1 times in the X direction as expressed by Formula (17) described above.

Therefore, the X coordinate is moved to the position expressed by Formula (18) described above, and an X-coordinate movement amount ΔXp is obtained by Formula (19) described above.

Here, in the barrel shift system, since the shake at the center is corrected for the whole image by driving the lens of the optical system 12, a Y-direction movement amount ΔYp can be obtained by Formula (33) as follows.
[Math. 33]

$$\Delta Y_p = L \cdot (\tan(\alpha p + (-\theta p)) - \tan \alpha p - \tan(-\theta p)) \tag{33}$$

Further, since the shift in the X direction is not considered in the barrel shift system, the X-direction movement amount ΔXp is expressed as it is by Formula (19) described above.

Similarly to the case of the shake by the pitch angle θp, when the image-capturing device 11 has shaken by the yaw angle θy, at the center position of the image, the pixel position is moved in the X direction by L·tan(−θy) pixels. And in the position of the coordinates A, the pixel position is moved in the X direction by an X-direction movement amount ΔXy expressed by Formula (20) described above.

Further, similarly, the pixel position is moved in the Y direction as well as in the X direction. When a Y coordinate as the destination has a relationship expressed by Formula (21) described above, the coordination is set L4/L3 times in the Y direction as expressed by Formula (22) described above.

Therefore, the Y coordinate is moved to the position expressed by Formula (23) described above, and a Y-coordinate movement amount ΔYy is obtained by Formula (24) described above.

Here, in the barrel shift system, since the shake at the center is corrected for the whole image by driving the lens of the optical system 12, a Y-direction movement amount ΔYy can be obtained by Formula (34) as follows.
[Math. 34]

$$\Delta Y_y = L \cdot (\tan(\alpha y + (-\theta y)) - \tan \alpha y - \tan(-\theta y)) \tag{34}$$

Further, since the shift in the X direction is not considered in the barrel shift system, the X-direction movement amount ΔXy is expressed as it is by Formula (20) described above.

Note that, since the barrel shift system cannot correct the roll angle θr, the correction of the roll angle θr is not performed.

Therefore, as the simplest method, the results obtained by individually calculating the effects of the camera shake for the pitch angle θp and the yaw angle θy in the two directions are added together, and a comprehensive X-direction movement amount ΔX and a comprehensive Y-direction movement amount ΔY will be obtained by Formula (35) as follows.
[Math. 35]

$$\Delta X = \Delta X_p + \Delta X_y$$

$$\Delta Y = \Delta Y_p + \Delta Y_y \tag{35}$$

Therefore, the X coordinate X' of the coordinates A' to be obtained can be obtained by Formula (36) as follows, and the Y coordinate Y' of the coordinates A' to be obtained can be obtained by Formula (37) as follows.

[Math. 36]

$$\begin{aligned} X' &= \Delta X + X \\ &= X \cdot (\cos \alpha p / \cos(\alpha p + (-\theta p)) - 1) + \\ & \quad L \cdot (\tan(\alpha y + (-\theta y)) - \tan \alpha y) + X \end{aligned} \tag{36}$$

[Math. 37]

$$\begin{aligned} Y' &= \Delta Y + Y \\ &= L \cdot (\tan(\alpha p + (-\theta p)) - \tan \alpha p) + \\ & \quad Y \cdot (\cos \alpha y / \cos(\alpha y + (-\theta y)) - 1) + Y \end{aligned} \tag{37}$$

Further, since the coordinates A (X, Y) has a relationship expressed by Formula (38) as follows, the X coordinate and Y coordinate of the coordinates A' are expressed by Formula (39).
[Math. 38]

$$X = L \cdot \tan \alpha y$$

$$Y = L \cdot \tan \alpha p \tag{38}$$

[Math. 39]

$$X' = X \cdot \cos \alpha p / \cos(\alpha p + (-\theta p)) + L \cdot (\tan(\alpha y + (-\theta y)) - \tan(-\theta p)) - X$$

$$Y' = L \cdot (\tan(\alpha p + (-\theta p)) - \tan(-\theta y)) + Y \cdot \cos \alpha y / \cos(\alpha y + (-\theta y)) - Y \tag{39}$$

Here, since the coordinates A'(X', Y') is a relative position from the coordinates O(x0, y0), a value of the coordinates A'(x', y') in the output image can be read on the basis of Formula (32) described above.

Then, when the processing of obtaining the coordinates A'(x', y') in the output image for all the pixels, the corrected image corrected for the camera shake can be acquired. Note that, although the correction of the barrel shift system in the pitch direction and the yaw direction has been described here, it is also possible to add the correction in the roll direction.

Meanwhile, in the first processing example to the third processing example of the camera correction processing described above, since the coordinates A'(x', y') in the output image does not always correspond to the center position of the pixels on the input image, it is necessary to obtain the pixel value by interpolation from the pixels in the periphery. That is, since the pixel position of each pixel constituting the corrected image (output image) does not correspond to the pixel position of each pixel constituting the image (input image) before the connection, the pixel value of the predetermined pixel is obtained by performing interpolation from the plurality of pixels around the predetermined pixel constituting the corrected image.

This interpolation method can use various interpolation techniques such as a nearest neighbor method, a bilinear method, and a bicubic method. Further, although pixels in the periphery used for the interpolation and calculation methods are different depending on forms of the input image and the output image (for example, a bayer image in which a color is determined according to the pixel position, an image having the same color at the respective pixels (RGB three colors or a single color), and a YUV image), the common thing is to obtain the value of the pixel calculated in each of the forms.

Further, in the first processing example to the third processing example of the camera correction processing described above, when the position of the pixel to be obtained is out of the image, it is necessary to perform processing of returning zero or like as the pixel value, or adding a limit to the correction amount so as to prevent the position from being out of the image. Here, when retuning zero or the like as the pixel value, data different from the original image is written into the periphery of the output image, but it is possible to perform processing of cutting out the final output image from a certain range of the original image, or magnifying the cut-out image. Typically, when the image that is a size larger than the final output image in a range capturing an angle to be corrected is prepared as the input image, it is possible to prevent such effect from being given to the finial output image.

Further, in this embodiment, for convenience of the description, the example that the correction position is calculated for all the pixels to correct the image has been described, but there may be used a method in which the whole image is divided into a plurality of blocks, and the correction position of a representative point for each division block is obtained, and the correction position of each pixel is obtained by interpolation from the value of the correction position of the representative position. Further, the numerical calculation may be simplified by using proximate calculation or the like.

Note that, in the barrel shift system (the third processing example), since the shake at the center of the image is corrected by the movement of the lens, compared with the first and second processing examples, the amount in which the position of the pixel to be obtained for the shake amount of the same angle is out of the image, is reduced.

Further, especially at the time of capturing a moving image, since the distortion appears large around the periphery of the image, processing of cutting out only the center of the image in which such distortion is little, or narrowing the view angle of the image sensor unit has been performed in the past. In contrast, in the camera shake correction processing by the image-capturing device 11 to which the present technology is applied, since the distortion around the periphery of the image can be corrected, it is possible to extend the view angle of the image-capturing device 11.

Figure 22:
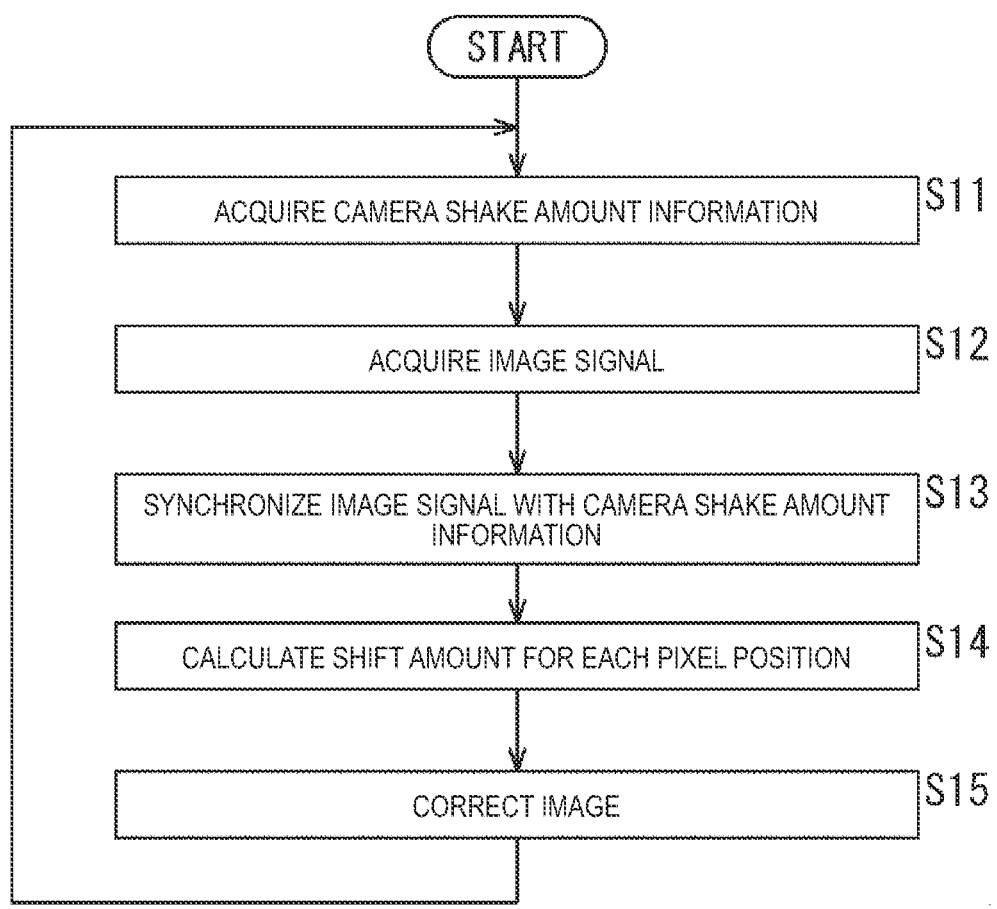
FIG. 22 is a flow chart for explaining an image-capturing method.

Next, FIG. 22 illustrates a flow chart for explaining an image-capturing method by the image-capturing device 11 of FIG. 1.

For example, when the image-capturing device 11 is turned on and is set to make the camera shake correction processing effective, the processing is started. At Step S11, the gyro sensor 22 starts outputting the camera shake amount signal (gyro data) at the constant timing, and the signal synchronization unit 23 sequentially acquires the camera shale amount signal from the gyro sensor 22.

At Step S12, the image sensor 21 outputs the image signal at the timing according to a horizontal synchronization signal, and the signal synchronization unit 23 sequentially acquires the image signal from the image sensor 21.

At Step S13, the signal synchronization unit 23 performs the synchronization between the camera shake amount and the image signal to output them to the camera shake correction processing unit 25.

At Step S14, the camera shake correction processing unit 25 calculates the shift amount for each pixel position. For example, the camera shake correction processing unit 25 performs the calculations according to Formula (15), Formula (19), Formula (20), Formula (24) and Formula (26) described above, and calculates the comprehensive X-direction movement amount ΔX and the comprehensive Y-direction movement amount ΔY for each pixel position on the basis of these calculation results.

At Step S15, the camera shake correction processing unit 25 corrects the image on the basis of the shift amount for each pixel position calculated at Step S14. For example, the camera shake correction processing unit 25 corrects the image by performing the calculation of Formula (31) described above to obtain the coordinates A'(X', Y') for each of the coordinates A(X, Y). After the processing at Step S15, the processing returns to Step S11, and the similar processing is repeated for the next frame to be processed.

Meanwhile, as described with reference to FIG. 5, when the error distance δ(θ, α, D) is in a region of less than 2 pixels, the distance difference between the point A and the point A' on the subject surface is not conspicuous. Therefore, when the camera shake correction processing using the correction amount Δy of Formula (6) described above and the correction amount Δx of Formula (8) described above is performed, it is possible to obtain the image in which the generation of the camera shake is sufficiently suppressed. However, for example, for a subject having the short subject distance D, the error distance δ(θ, α, D) may equal to or more than 2 pixels, and an image having the conspicuous camera shake may be obtained even after the camera shake correction processing.

Then, for example, by performing the camera shake correction processing in which an additional correction amount using the subject distance D is added to the correction amount Δy of Formula (6) described above and the correction amount Δx of Formula (8) described above, it is possible to suppress the camera shake for the subject having the short subject distance D. For example, by estimating the subject distance D to the subject to be focused using an auto focus (AF) function, the camera shake correction processing according to the subject distance D is performed so that the camera shake at the subject is most suppressed.

Figure 23:
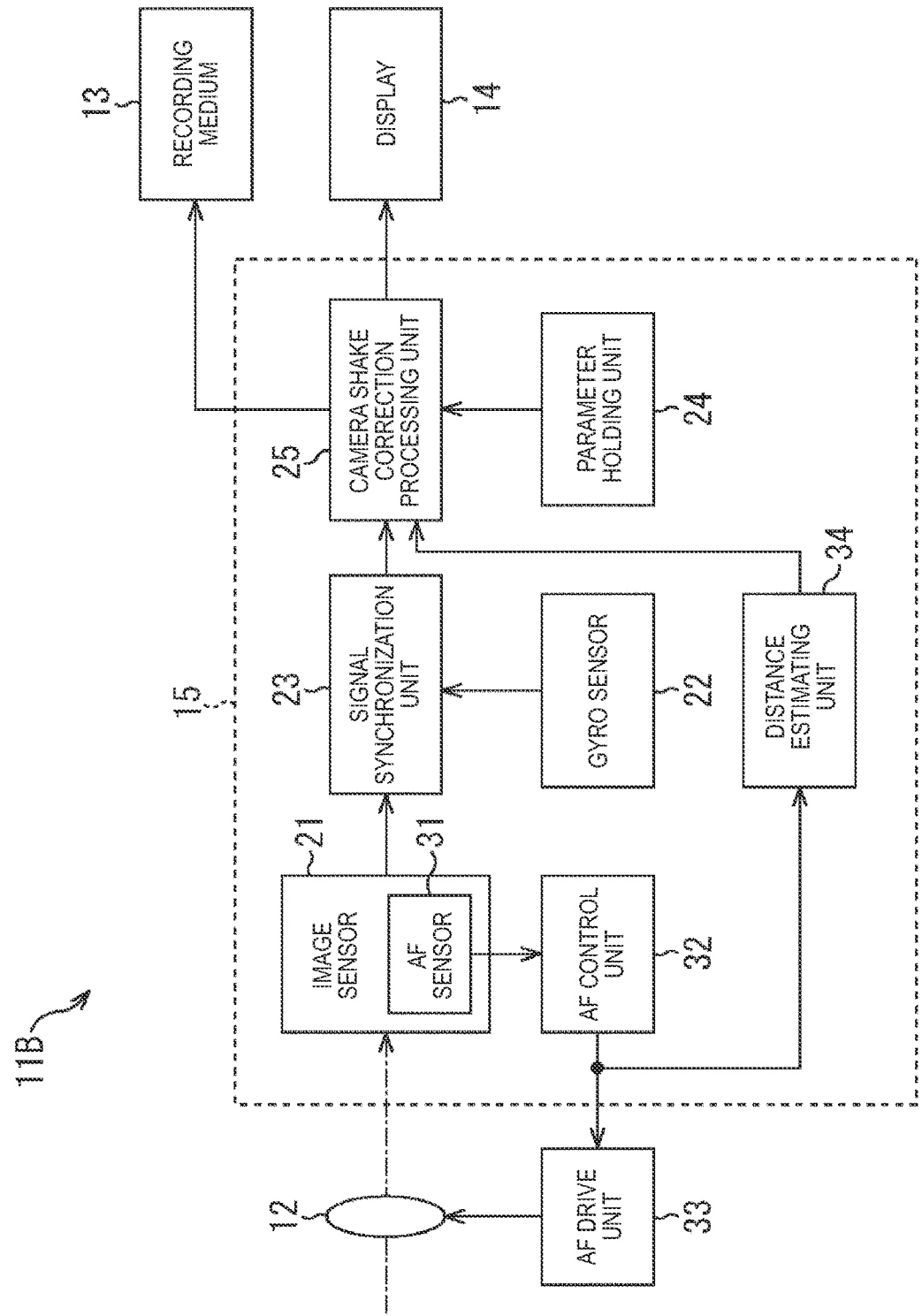
FIG. 23 is a block diagram illustrating a configuration example of another embodiment of the image-capturing device to which the present technology is applied.

Next, FIG. 23 is a block diagram illustrating a configuration example of another embodiment of the image-capturing device to which the present technology is applied.

FIG. 23 illustrates an image-capturing device 11B that performs the camera shake correction processing according to the subject distance D to the subject to be focused. Note that, in the image-capturing device 11B of FIG. 23, structural elements in common with the image-capturing device 11 of FIG. 1 are denoted with the same reference numerals, and detailed explanation of these structural elements is omitted.

As shown in FIG. 23, the image-capturing device 11B includes an AF sensor 31, an AF control unit 32, an AF drive unit 33, and a distance estimating unit 34 in addition to the configuration of the image-capturing device 11 of FIG. 1.

The AF sensor 31 has, for example, a plurality of phase difference detection pixels embedded in the sensor surface of the image sensor 21. The phase difference detection pixels are configured by combining pixels having a left-half light-shielded part with pixels having a right-half light-shielded part, and are arranged in predetermined positions on the sensor surface. The image formed by image signals outputted from the pixels having the left-half light-shielded part and the image formed by image signals outputted from the pixels having the right-half light-shielded part are supplied from the AF sensor 31 to the AF sensor drive unit 33.

The AF control unit 32 calculates the distance to the subject to be focused on the basis of the shift of the position of the subject on the two images supplied from the AF sensor 31. Then, the AF control unit 32 determines the lens position of the lens for focus adjustment of the optical system 12 so as to focus on the distance, and supplies an AF control signal having a current value corresponding to the determined lens position to the AF drive unit 33.

The AF drive unit 33 has an actuator for driving the lens for focus adjustment of the optical system 12, and drives the lens for focus adjustment according to the current value of the AF control signal supplied from the AF control unit 32 to focus on the subject.

The distance estimating unit 34 is supplied with the AF control signal outputted from the AF control unit 32 to the AF drive unit 33, and the distance estimating unit 34 estimates the subject distance D to the subject to be focused from the current value of the AF control signal. The distance estimating unit 34 then supplies the subject distance D estimated from the current value of the AF control signal to the camera shake correction processing unit 25.

Here, with reference to FIG. 24, a relationship between the current value of the AF control signal and the subject distance D will be discussed.

Figure 24:
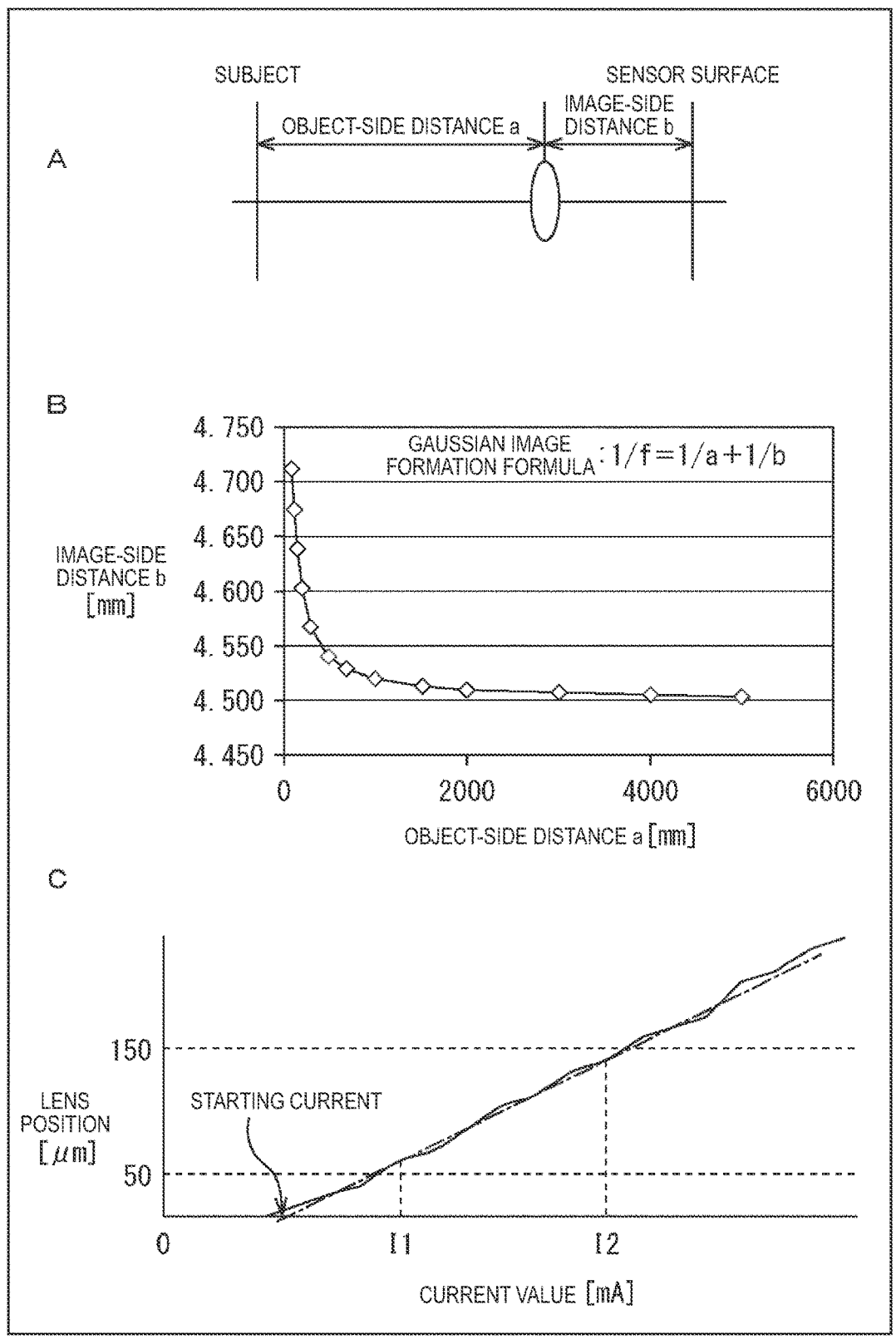
FIG. 24 is a diagram for explaining a relationship between a current value of an AF control signal and a subject distance.

As shown in A of FIG. 24, when a distance from the lens to the subject is an object-side distance a, and a distance from the lens to the sensor surface is an image-side distance b, a relationship between the object-side distance a and the image-side distance b is according to a focal distance f of the lens.

That is, the relationship between the object-side distance a and the image-side distance b is, as shown in B of FIG. 24, obtained by a Gaussian image formation formula (1/f=1/a+1/b). In B of FIG. 24, the horizontal axis represents the object-side distance a, and the vertical axis represents the image-side distance b, and the shorter the object-side distance a, the longer the image-side distance b. Especially, when the subject to be focused is very close, that is, when the object-side distance a is extremely short, the image-side distance b drastically becomes long.

Further, the AF drive unit 33 linearly drives the lens for focus adjustment of the optical system 12 according to the current value of the AF control signal supplied from the AF control unit 32. In C of FIG. 24, the horizontal axis represents the current value of the AF control signal, and the vertical axis represents the lens position of the lens for focus adjustment, and the lens position of the lens for focus adjustment nearly linearly changes with respect to the current value of the AF control signal.

Therefore, the distance estimating unit 34 can calculate the lens position of the lens for focus adjustment driven by the AF drive unit 33 from the current value of the AF control signal supplied to the AF drive unit 33, on the basis of the nearly linear relationship. Then, when the object-side distance a is determined according to the lens position of the lens for focus adjustment, the distance estimating unit 34 can calculate the image-side distance b from the Gaussian image formation formula shown in B of FIG. 24 to estimate the subject distance D to the subject to be focused.

The distance estimating unit 34 supplies the subject distance D estimated in this manner to the camera shake correction processing unit 25, and the camera shake correction processing unit 25 can performs the camera shake correction processing according to the subject distance D. For example, as described above, when the subject distance D to the subject to be focused is close to the extent that the error distance δ(θ, α, D) is 2 pixels or more, the camera shake correction processing unit 25 can obtain the additional correction amount to be added to the correction amount Δy of Formula (6) described above and the correction amount Δx of Formula (8) described above by using the subject distance D, so that the camera shake correction processing can be performed by using the correction amount obtained by adding that additional correction amount. This allows the error distance δ(θ, α, D) at the subject to be focused to be reduced to 2 pixels or less.

FIG. 25 illustrates an example of the relationship between the predetermined subject distance D and the error distance δx in the X direction, obtained when the image-capturing device 11B has shaken in the roll direction.

As shown in FIG. 25, for example, when a distance r to the rotational center in the roll direction of the image-capturing device 11B is 100 mm, and a shake angle θ is 0.5°, a movement amount r·sin θ in the X direction is calculated as 872.7 μm, and a movement amount r·(1−cos θ) in the Y direction is calculated as 3.8 μm.

Then, when the subject distance D is 2.4 m, a range capable of capturing an image in the X direction (=2·D·TAN β) is calculated as 2.47 m. the error distance δx in the X direction is calculated as 1.5 according to Formula (5) described above. Similarly, when the subject distance D is 1.4 m, the range capable of capturing an image in the X direction is calculated as 1.44 m. the error distance δx in the X direction is calculated as 2.5. Further, when the subject distance D is 0.35 m, the range capable of capturing an image in the X direction is calculated as 0.36 m. the error distance δx in the X direction is calculated as 10.1.

In this manner, when the subject distance D to the subject to be focused is close, and the error distance δx in the X direction is 2 pixels or more, the camera shake occurs in the subject at the error distance δx in the X direction. Therefore, when the error distance δx in the X direction is added to the correction value to perform the camera shake correction processing, it is possible to suppress the camera shake in the subject to be focused. That is, the camera shake correction processing unit 25 performs the camera shake correction processing in which the error distance δx in the X direction is added as the additional correction amount to be added to the correction amount Δx of Formula (8) described above (pixel count to be additionally corrected).

Here, the correction in the X direction has been described, but also in the Y direction, the camera shake correction processing unit 25 similarly performs the camera shake correction processing in which the error distance δy in the Y direction is added as the additional correction amount to be added to the correction amount Δy of Formula (6) described above.

That is, the correction amount Δy in the Y direction when the camera shake correction processing according to the subject distance D to the subject to be focused is performed, can be calculated by Formula (40) obtained by adding the error distance δy in the Y direction to Formula (6) described above, as follows.

[Math. 40]

$$\Delta y = \\ d \cdot (\text{TAN}\alpha - \text{TAN}(\alpha + \theta)) + [\{r \cdot \text{SIN}\theta - d \cdot (1 - \text{COS}\theta)\} \cdot \text{TAN}\alpha + \\ d \cdot \text{SIN}\theta + r \cdot (1 - \text{COS}\theta)] \times \frac{Ny}{2 \cdot D \cdot \text{TAN}\beta} \quad (40)$$

However, in Formula (40), d represents an optical pupil distance from the center point of the sensor surface S to the pupil position I, α represents an elevation angle from the pupil position I to the point A on the subject surface, θ represents a shake angle around the rotation center O, r represents a rotation radius as a distance from the rotational center O to the center point of the sensor surface S, D represents a subject distance to the subject to be focused, Ny represents a pixel count of a side in the Y-axis direction of the image sensor 21, and β represents a maximum view angle in the Y-axis direction of the image sensor 21.

Similarly, the correction amount Δx in the X direction when the camera shake correction processing according to the subject distance D to the subject to be focused is performed, can be calculated by Formula (41) obtained by adding the error distance δx in the X direction to Formula (8) described above, as follows.

[Math. 41]

$$\Delta x = X \cdot \left(1 - \frac{\cos\alpha}{\cos(\alpha + \theta)}\right) + [\{r \cdot \sin\theta - d \cdot (1 - \cos\theta)\} \cdot \tan\alpha + d \cdot \sin\theta + r \cdot (1 - \cos\theta)] \times \frac{Nx}{2 \cdot D \cdot \tan\gamma} \quad (41)$$

However, in Formula (41), d represents an optical pupil distance from the center point of the sensor surface S to the pupil position I, α represents an elevation angle from the pupil position I to the point A on the subject surface, θ represents a shake angle around the rotation center O, r represents a rotation radius as a distance from the rotational center O to the center point of the sensor surface S, D represents a subject distance to the subject to be focused, Nx represents a pixel count of one side in the X-axis direction of the image sensor 21, and γ represents a maximum view angle in the X-axis direction of the image sensor 21.

For example, the subject distance in which the error distance δ(θ, α, D) is 2 pixels or more is calculated in advance, and can be set as a threshold value to the camera shake correction processing unit 25. Then, the camera shake correction processing unit 25, when the subject distance D estimated by the distance estimating unit 34 is less than the threshold value, can perform the camera shake correction processing according to the subject distance D to the subject to be focused.

Accordingly, the image-capturing device 11B can perform the camera shake correction processing so that the camera shake is most reduced in the subject to be focused. Therefore, even when the subject is very close, it is possible to suppress the occurrence of the camera shake more securely to improve image quality. Further, the image-capturing device 11B, only when the subject distance in which the error distance δ(θ, α, D) is 2 pixels or more is calculated in advance and is less than the threshold value, has only to perform the camera shake correction processing according to the subject distance D, and can reduce the processing load.

Figure 26:
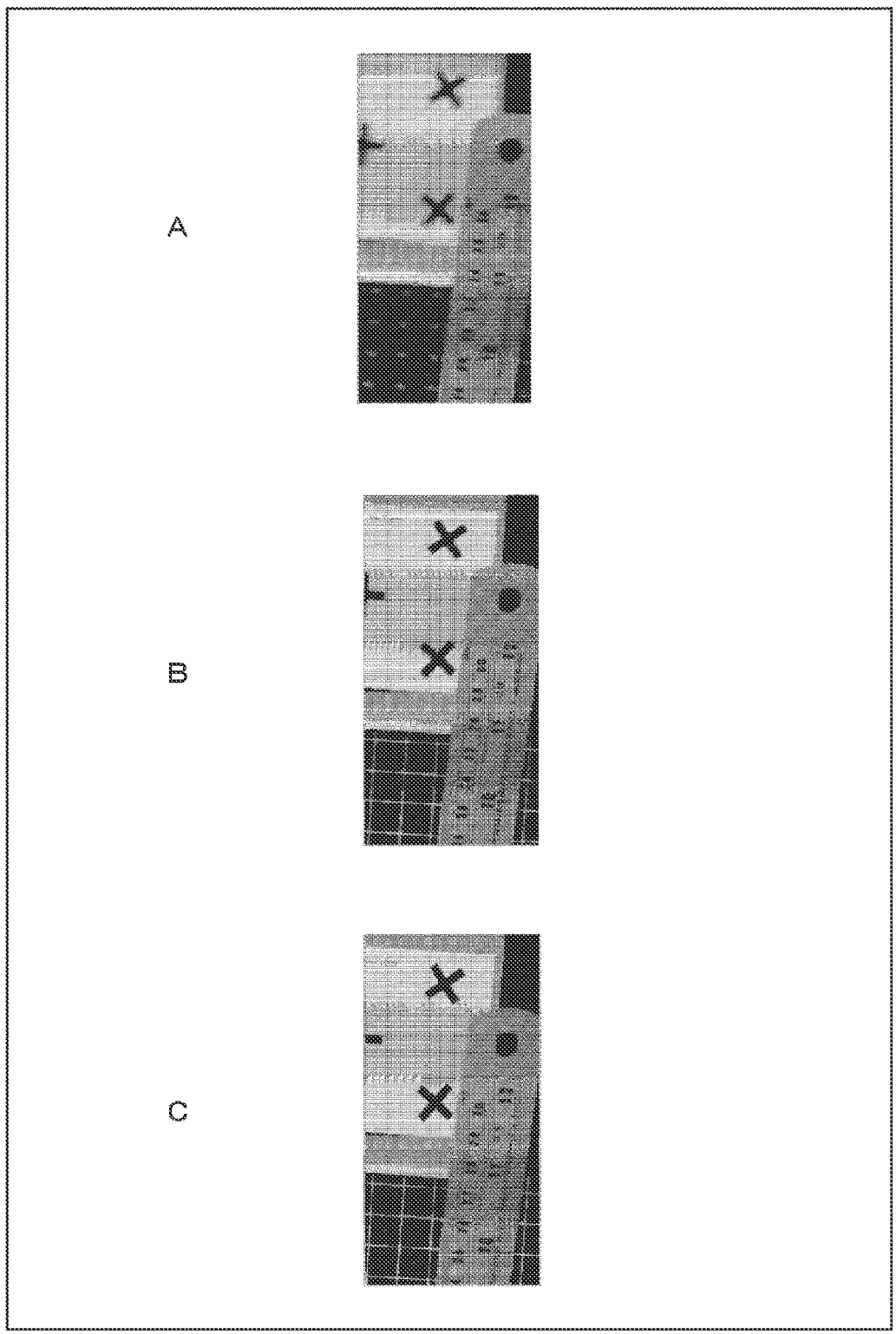
FIG. 26 is a diagram for explaining an effect of the camera shake correction processing by comparison.

FIG. 26 is a diagram for explaining the effect of the camera shake correction processing according to the subject distance D by comparison.

FIG. 26 illustrates the images captured when the scale is arranged on the front side, and the panel having a grating pattern is arranged on the back side. A of FIG. 26 illustrates the image subjected to no camera shake correction processing, B of FIG. 26 illustrates the image subjected to the camera shake correction processing when the subject distance D is set to the position at which the scale is arranged, and C of FIG. 26 illustrates the image subjected to the camera shake correction processing when the subject distance D is set to the position at which the grating pattern is arranged.

As can be seen from the image shown in A of FIG. 26, when the image is subjected to no camera shake correction processing, the camera shake occurs in both the scale and the grating pattern. Further, as can be seen from the image shown in B of FIG. 26, when the image is subjected to the camera shake correction processing on the condition that the subject distance D is set to the position at which the scale is arranged, the camera shake for the scale is suppressed and the camera shake occurs in the grating pattern on the back side. Further, as can be seen from the image shown in C of FIG. 26, when the image is subjected to the camera shake correction processing on the condition that the subject distance D is set to the position at which the grating pattern is arranged, the camera shake for the grating pattern is suppressed and the camera shake occurs in the scale on the front side.

In this manner, when the camera shake correction processing according to the subject distance D is performed, it is possible to effectively suppress the camera shake for the subject to be focused.

Note that, as described with reference to C of FIG. 24, the lens position of the lens for focus adjustment has such a relationship as to nearly linearly change with respect to the current value of the AF control signal, but the relationship may not be nearly linear, for example, depending on the posture of the image-capturing device 11. That is, the lens position of the lens for focus adjustment is different according to gravitational force acting on the lens for focus adjustment, for example, between when the image-capturing device 11 faces upward and when the image-capturing device 11 faces downward.

Accordingly, the image-capturing device 11B can calculate a more accurate correction amount by correcting the subject distance D on the basis of the posture of the image-capturing device 11.

That is, for example, in the image-capturing device 11, the gyro sensor 22 measures a gravitational force direction (that is, the posture of the image-capturing device 11), and supplies the gravitational force direction to the distance estimating unit 34. Then, the distance estimating unit 34 that holds a correspondence relationship between the predetermined gravitational force direction and the correction amount of the subject distance D can correct the subject distance D according to the gravitational force direction supplied from the gyro sensor 22. Accordingly, it is possible to accurately perform the camera shake correction processing even when the image-capturing device 11 takes any posture.

Note that, in the image-capturing device 11B, the AF sensor 31 is not limited to the configuration in which the phase difference detection pixels are embedded in the sensor surface of the image sensor 21. For example, the image-capturing device 11B can have a configuration where the distance to the subject is obtained by dividing a part of light traveling to the image sensor 21, or a configuration where the distance to the subject is obtained on the basis of contrast of the image outputted from the image sensor 21.

Further, the image-capturing device 11B may have a configuration where the AF control unit 32 directly supplies a signal indicating the distance to the subject to the camera shake correction processing unit 25 without providing the distance estimating unit 34. Further, it may have a configuration where the AF drive unit 33 drives the lens for focus adjustment according to a pulse signal, and in this case, the AF control unit 32 can output the pulse signal as the AF control signal, and the distance estimating unit 34 can estimate the distance to the subject by counting the pulse.

Figure 27:
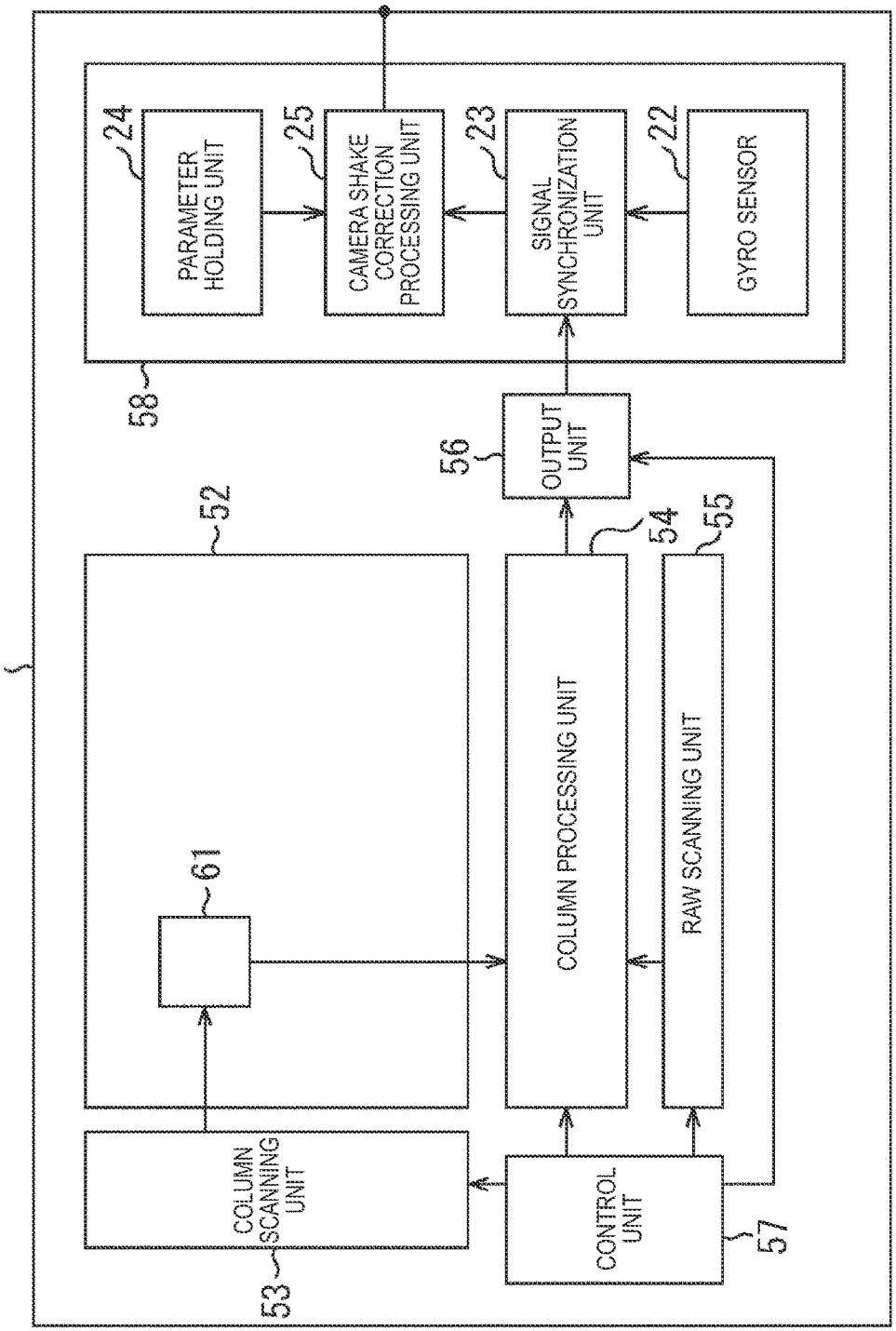
FIG. 27 is a block diagram illustrating a configuration example of an embodiment of a solid-state image-capturing element to which the present technology is applied.

FIG. 27 is a block diagram illustrating a configuration example of an embodiment of a solid-state image-capturing element to which the present technology is applied.

As shown in FIG. 27, a solid-state image-capturing element 51 includes a pixel array unit 52, a raw scanning unit 53, a column processing unit 54, a column scanning unit 55, an output unit 56, a control unit 57, and a logic circuit 58.

In the pixel array unit 52, a plurality of pixels 61 are arranged in an array, and the pixels 61 are driven for each row according to control from the raw scanning unit 53, and output pixel signals according to charges generated by photoelectric conversion to the column processing unit 54 in parallel for each column.

The column scanning unit 53 supplies a drive signal for driving the pixels 61 of the pixel array unit 52 for each raw (for example, a transfer signal, a selection signal, and a reset signal).

The column processing unit 54 performs analog/digital (A/D) conversion of the pixel signals supplied from the pixels 61 of the pixel array unit 52, in parallel for each column, and sequentially supplies the converted signals to the output unit 56 according to control from the column scanning unit 55.

The column scanning unit 55 controls the column processing unit 54 to sequentially output the pixel signals at predetermined timing.

The output unit 56 outputs the pixel signals supplied from the column processing unit 54, for example, after amplifying them at a predetermined gain.

The control unit 57 supplies a clock signal as a reference of the drive or a control signal for controlling the drive, of the raw scanning unit 53, the column processing unit 54, the column scanning unit 55, and the output unit 56.

The logic circuit 58 has a gyro sensor 22, a signal synchronization unit 23, a parameter holding unit 24, and a camera shake correction processing unit 25. The gyro sensor 22, the signal synchronization unit 23, the parameter holding unit 24, and the camera shake correction processing unit 25 are similar in configuration to those of FIG. 1, and the detailed description thereof are omitted.

That is, the solid-state image-capturing element 51 can perform the camera shake correction processing similar to that of the camera module 15 of FIG. 1 therein. Note that, for example, the logic circuit 58 can be provided as a periphery circuit of the pixel array unit 52 on the same circuit board as that of the pixel array unit 52, or can be provided on a circuit board different from that of the pixel array unit 52, both of which are laminated.

In this manner, the solid-state image-capturing element 51 can output the image subjected to the camera shake correction processing.

Note that the present technology may be applied to a device, such as a personal computer, which acquires captured image data and gyro data in synchronization with the image data to provide the camera shake correction processing ex post, in addition to the image-capturing device.

Additionally, the present technology may also be configured as below.

(1)

An image-capturing device including:

an image-capturing unit that captures a subject to output the captured image;

a detection unit that physically detects a shake angle when the image-capturing unit has shaken; and a correction processing unit that calculates a correction amount based on a position of a pixel constituting the image outputted by the image-capturing unit and the shake angle detected by the detection unit, to correct the image according to the correction amount.

(2)

The image-capturing device according to (1), wherein the correction processing unit uses the different correction amounts depending on distances in a vertical direction and in a horizontal direction from a substantial center of the image.

(3)

The image-capturing device according to (1) or (2), wherein the correction processing unit performs calculation according to a geometric and optical calculation formula to calculate the correction amount for each pixel, by using a pupil distance as an optical distance from a pupil position of an optical system for forming the image of the subject on a sensor surface of the image-capturing unit to the sensor surface of the image-capturing unit, an arrangement position of a predetermined pixel of the image supplied from the image-capturing unit, an elevation angle from the pupil position with respect to a point on the sensor surface corresponding to the arrangement position, and the shake angle.

(4)

The image-capturing device according to (3), wherein the correction amount is expressed by the Formula (6) and Formula where, in the Formula (6) or Formula (8), $\Delta x$ represents the correction amount in a horizontal direction of the image, $\Delta y$ represents the correction amount in a vertical direction of the image, d represents the pupil distance, $\alpha$ represents the elevation angle, $\theta$ represents the shake angle, and X represents a distance in the horizontal direction from the substantial center of the image, of an pixel to be corrected.

(5)

The image-capturing device according to any of (1) to (4), wherein the correction processing unit performs interpolation from a predetermined number of the pixels around the predetermined pixel constituting the corrected image to obtain a pixel value of the predetermined pixel, so that a pixel position of each pixel constituting the corrected image corrected according to the correction amount corresponds to a pixel position of each pixel constituting the image before the correction.

(6)

The image-capturing device according to any of (1) to (5), further including:

a synchronization unit that synchronizes the image outputted from the image-capturing unit with the shake angle outputted from the detection unit to transmit the image and the shake angle to the correction processing unit.

(7)

The image-capturing device according to any of (1) to (6), wherein the synchronization unit synchronizes the image outputted from the image-capturing unit with the shake angle outputted from the detection unit for each horizontal line of the image outputted from the image-capturing unit.

(8)

The image-capturing device according to any of (1) to (7), wherein the correction processing unit, when the image-capturing unit has shaken, calculates the correction amount for correcting an effect on a vertical direction of the image by the shake angle when the image is vertically moved, and in addition, the correction amount for correcting an effect on a horizontal direction of the image by the shake angle when the image is vertically moved, and wherein the correction processing unit, when the image-capturing unit has shaken, calculates the correction amount for correcting an effect on the horizontal direction of the image by the shake angle when the image is horizontally moved, and in addition, the correction amount for correcting an effect on the vertical direction of the image by the shake angle when the image is horizontally moved.

(9)

The image-capturing device according to any of (1) to (7), wherein the image-capturing unit captures the image by using a global shutter system in which the whole image is recorded nearly at the same time.

(10)

The image-capturing device according to any of (1) to (7), wherein the image-capturing unit captures the image by using a rolling shutter system in which capturing timing is different for each horizontal line within the image.

(11)

The image-capturing device according to any of (1) to (10), further including:

a drive unit that drives a lens of an optical system for forming the image of the subject on a sensor surface of the image-capturing unit nearly in parallel with the sensor surface of the image-capturing unit, in a direction in which the image on the image-capturing unit does not move, on the basis of the shake angle detected by the detection unit, wherein a part not depending on the arrangement position of the pixel on the image surface is corrected by the parallel drive.

(12)

The image-capturing device according to (3), wherein the correction processing unit further uses a subject distance as an optical distance from the pupil position to the subject to be focused to calculate an additional correction amount for additionally correcting the correction amount to perform camera shake correction processing according to the subject distance.

(13)

The image-capturing device according to (12), wherein the correction amount when performing the camera shake correction processing according to the subject distance, is expressed by the Formula (40) and Formula (41) where, in the Formula (40) and Formula (41), $\Delta x$ represents the correction amount in a horizontal direction of the image, $\Delta y$ represents the correction amount in a vertical direction of the image, d represents the pupil distance, $\alpha$ represents the elevation angle, $\theta$ represents the shake angle, X represents a distance in the horizontal direction from the substantial center of the image, of an pixel to be corrected, r represents a rotation radius as a distance from a rotational center to a center point of the sensor surface when the image-capturing device has shaken, D represents the subject distance to the subject to be focused, Ny represents a pixel count of a side in the vertical direction of the image-capturing unit, $\beta$ represents a maximum view angle in the vertical direction of the image-capturing unit, Nx represents a pixel count of a side in the horizontal direction of the image-capturing unit, and $\gamma$ represents a maximum view angle in the horizontal direction of the image-capturing unit.

(14)

The image-capturing device according to (12) or (13), wherein the correction processing unit, when the subject distance to the subject to be focused is equal to or less than a predetermined threshold value previously set, performs the camera shake correction processing according to the subject distance.

(15)

The image-capturing device according to any of (12) to (14), further including:

a focus drive unit that drives a lens for focus adjustment of the optical system to focus on a desired subject; and a subject distance estimating unit that estimates the subject distance to the subject to be focused on the basis of a control signal for controlling the drive of the lens for focus adjustment by the focus drive unit.

(16)

The image-capturing device according to (15), wherein the detection unit detects a direction of gravitational acceleration to supply the direction of the gravitational acceleration to the subject distance estimating unit, and wherein the subject distance estimating unit corrects the estimated subject distance according to the direction of the gravitational acceleration.

(17)

A solid-state image-capturing element including:

an image-capturing unit that captures a subject to output the captured image;

a detection unit that physically detects a shake angle when the image-capturing unit has shaken; and a correction processing unit that calculates a correction amount based on an arrangement position of a pixel constituting the image outputted by the image-capturing unit, and the shake angle detected by the detection unit, to correct the image according to the correction amount.

(18)

A camera module including:

an image-capturing unit that captures a subject to output the captured image;

a detection unit that physically detects a shake angle when the image-capturing unit has shaken; and a correction processing unit that calculates a correction amount based on an arrangement position of a pixel constituting the image outputted by the image-capturing unit, and the shake angle detected by the detection unit, to correct the image according to the correction amount.

(19)

An electronic device including:

an image-capturing unit that captures a subject to output the captured image;

a detection unit that physically detects a shake angle when the image-capturing unit has shaken; and a correction processing unit that calculates a correction amount based on an arrangement position of a pixel constituting the image outputted by the image-capturing unit, and the shake angle detected by the detection unit, to correct the image according to the correction amount.

(20)

An image-capturing method for an image-capturing device including an image-capturing unit that captures a subject to output the captured image, and a detection unit that physically detects a shake angle when the image-capturing unit has shaken, the method including the steps of:

outputting the image by the image-capturing unit;

outputting the shake angle by the detection unit; and calculating a correction amount based on an arrangement position of a pixel constituting the image outputted by the image-capturing unit, and the shake angle detected by the detection unit, to correct the image according to the correction amount.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

REFERENCE SIGNS LIST 11 image-capturing device
12 optical system
13 recording medium
14 display
15 camera module
21 image-capturing element
22 gyro sensor
23 signal synchronization unit
24 parameter holding unit
25 camera shake correction processing unit
26 drive unit
51 solid-state image-capturing element
52 pixel array
53 raw scanning unit
54 column processing unit
55 column scanning unit
56 output unit
57 control unit
58 logic circuit

What is claimed is:

1. A solid-state image-capturing element, comprising:
a pixel circuit; and
a logic circuit, the logic circuit comprising:
a gyro sensor that physically detects a shake angle; and
a camera shake correction processing unit that calculates a correction amount based on an arrangement position of a pixel within a set of pixels constituting an image output from an output unit and the shake angle detected by the gyro sensor, to correct the image according to the correction amount to obtain a corrected image,
wherein the logic circuit is provided on a first circuit board which is different from a second circuit board on which the pixel circuit is provided, and
wherein the camera shake correction processing unit calculates the correction amount for each pixel in the set of pixels by using a pupil distance as an optical distance from a pupil position of an optical system for forming the image to a surface of the solid-state image-capturing element, the arrangement position, an elevation angle from the pupil position with respect to a point on the surface corresponding to the arrangement position, and the shake angle.

2. The solid-state image-capturing element according to claim 1,
wherein the camera shake correction processing unit uses different correction amounts depending on distances in a vertical direction and in a horizontal direction from a substantial center of the image.

3. The solid-state image-capturing element according to claim 1,
wherein the correction amount for each pixel in the set of pixels to be corrected is expressed by Formula (1) and Formula (2) as follows:

[Formula (1)]
$$\Delta y = d \cdot (TAN\alpha - TAN(\alpha + \theta)) \quad (1)$$

[Formula (2)]
$$\Delta x = X \cdot \left(1 - \frac{COS\alpha}{COS(\alpha + \theta)}\right) \quad (2)$$

wherein $\Delta x$ represents the correction amount in a horizontal direction of the image, $\Delta y$ represents the correction amount in a vertical direction of the image, d represents the pupil distance, $\alpha$ represents the elevation angle, $\theta$ represents the shake angle, and X represents a distance in the horizontal direction from a center of the image.

4. The solid-state image-capturing element according to claim 1,
wherein the camera shake correction processing unit performs interpolation from a predetermined number of pixels around the set of pixels to be corrected to obtain a pixel value of each of the set of pixels to be corrected, so that a pixel position of each pixel constituting the corrected image corresponds to a pixel position of each pixel constituting the image before the correction.

5. The solid-state image-capturing element according to claim 1, wherein the logic circuit further comprises:
a signal synchronization unit that synchronizes the image output from the output unit with the shake angle output from the gyro sensor to transmit the image and the shake angle to the camera shake correction processing unit.

6. The solid-state image-capturing element according to claim 5,
wherein the image comprises horizontal lines, and the signal synchronization unit synchronizes the image output from the output unit with the shake angle output from the gyro sensor for each of the horizontal lines.

7. The solid-state image-capturing element according to claim 1,
wherein the correction amount comprises correcting an effect on a vertical direction of the image by the shake angle when the image is vertically moved, and further comprises correcting an effect on a horizontal direction of the image by the shake angle when the image is vertically moved; and
wherein the correction amount further comprises correcting an effect on the horizontal direction of the image by the shake angle when the image is horizontally moved, and further comprises correcting an effect on the vertical direction of the image by the shake angle when the image is horizontally moved.

8. The solid-state image-capturing element according to claim 1,
wherein the solid-state image-capturing element captures the image by using a global shutter system in which a whole image is recorded substantially at a same time.

9. The solid-state image-capturing element according to claim 1,
wherein the solid-state image-capturing element captures the image by using a rolling shutter system in which capturing timing is different for each horizontal line within the image.

10. The solid-state image-capturing element according to claim 1,
wherein a drive unit drives a lens of an optical system for forming the image on a surface of the solid-state image-capturing element in a direction in which the image on the solid-state image-capturing element does not move, on the basis of the shake angle detected by the gyro sensor; and wherein a part not depending on the arrangement position of the pixel is corrected by a parallel drive by using the drive unit.

11. The solid-state image-capturing element according to claim 1, wherein the camera shake correction processing unit uses a subject distance as an optical distance from the pupil position to a subject to calculate an additional correction amount for additionally correcting the correction amount to perform camera shake correction processing according to the subject distance.

12. The solid-state image-capturing element according to claim 11, wherein the correction amount, when performing the camera shake correction processing according to the subject distance, is expressed by Formula (3) and Formula (4) as follows:

[Formula (3)]

$$\Delta y = d \cdot (TAN\alpha - TAN(\alpha + \theta)) + [\{r \cdot SIN\theta - d \cdot (1 - COS\theta)\} \cdot TAN\alpha + d \cdot SIN\theta + r \cdot (1 - COS\theta)] \times \frac{Ny}{2 \cdot D \cdot TAN\beta} \quad (3)$$

[Formula (4)]

$$\Delta x = X \cdot \left(1 - \frac{COS\alpha}{COS(\alpha + \theta)}\right) + [\{r \cdot SIN\theta - d \cdot (1 - COS\theta)\} \cdot TAN\alpha + d \cdot SIN\theta + r \cdot (1 - COS\theta)] \times \frac{Nx}{2 \cdot D \cdot TAN\gamma} \quad (4)$$

wherein $\Delta x$ represents the correction amount in a horizontal direction of the image, $\Delta y$ represents the correction amount in a vertical direction of the image, d represents the pupil distance, $\alpha$ represents the elevation angle, $\theta$ represents the shake angle, X represents a distance in the horizontal direction from a center of the image, of a pixel to be corrected, r represents a rotation radius as a distance from a rotational center to a center point of the surface when the solid-state image-capturing element has shaken, D represents the subject distance, Ny represents a pixel count of a side in the vertical direction of the solid-state image-capturing element, $\beta$ represents a maximum view angle in the vertical direction of the solid-state image-capturing element, Nx represents a pixel count of a side in the horizontal direction of the solid-state image-capturing element, and $\gamma$ represents a maximum view angle in the horizontal direction of the solid-state image-capturing element.

13. The solid-state image-capturing element according to claim 11, wherein the camera shake correction processing unit, when the subject distance is equal to or less than a predetermined threshold value previously set, performs the camera shake correction processing according to the subject distance.

14. The solid-state image-capturing element according to claim 11, wherein a focus drive unit drives a lens for focus adjustment of the optical system to focus on a subject captured in the image; and wherein a subject distance estimating unit estimates the subject distance on the basis of a control signal for controlling the drive of the lens for focus adjustment by the focus drive unit.

15. The solid-state image-capturing element according to claim 14, wherein the gyro sensor detects a direction of gravitational acceleration to supply the direction of the gravitational acceleration to the subject distance estimating unit; and wherein the subject distance estimating unit corrects the estimated subject distance according to the direction of the gravitational acceleration.

16. An image-capturing camera module, comprising:

a solid-state image-capturing element, the solid-state image-capturing element comprising:
a pixel circuit; and
a logic circuit, the logic circuit comprising:
a gyro sensor that physically detects a shake angle when the image-capturing camera module has shaken; and
a camera shake correction processing unit that calculates a correction amount based on an arrangement position of a pixel within a set of pixels constituting an image output from an output unit, and the shake angle detected by the gyro sensor, to correct the image according to the correction amount to obtain a corrected image,
wherein the logic circuit is provided on a first circuit board which is different from a second circuit board on which the pixel circuit is provided, and
wherein the camera shake correction processing unit calculates the correction amount for each pixel in the set of pixels by using a pupil distance as an optical distance from a pupil position of an optical system for forming the image to a surface of the solid-state image-capturing element, the arrangement position, an elevation angle from the pupil position with respect to a point on the surface corresponding to the arrangement position, and the shake angle.

17. A method for a solid-state image-capturing element that captures a subject to output an image, the solid-state image-capturing element comprising a pixel circuit and a logic circuit, the logic circuit comprising a gyro sensor that physically detects a shake angle and a camera shake correction processing unit, the method comprising the steps of:

outputting the image from an output unit;
outputting the shake angle by the gyro sensor; and
calculating a correction amount based on an arrangement position of a pixel within a set of pixels constituting the image output from the output unit, and the shake angle detected by the gyro sensor, to correct the image according to the correction amount to obtain a corrected image, wherein the correction amount for each pixel in the set of pixels by using a pupil distance as an optical distance from a pupil position of an optical system for forming the image to a surface of the solid-state image-capturing element, the arrangement position, an elevation angle from the pupil position with respect to a point on the surface corresponding to the arrangement position, and the shake angle.

* * * * *